(12) United States Patent
Zeng et al.

(10) Patent No.: US 10,145,320 B1
(45) Date of Patent: Dec. 4, 2018

(54) METHODS AND SYSTEMS FOR BOOST AND EGR CONTROL

(71) Applicant: Ford Global Technologies, LLC, Dearborn, MI (US)

(72) Inventors: Tao Zeng, Bloomfield Hills, MI (US); Eric Warren Curtis, Milan, MI (US); Satheesh Makkapati, Canton, MI (US); Brad Alan Boyer, Canton, MI (US); Joseph Norman Ulrey, Dearborn, MI (US); David R. Hanna, Troy, MI (US); Devesh Upadhyay, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/693,167

(22) Filed: Aug. 31, 2017

(51) Int. Cl.
| | |
|---|---|
| *F02M 26/00* | (2016.01) |
| *F02B 37/00* | (2006.01) |
| *F02D 41/00* | (2006.01) |
| *F02D 13/02* | (2006.01) |
| *F02B 37/24* | (2006.01) |
| *F02M 26/04* | (2016.01) |
| *F02M 26/34* | (2016.01) |
| *F02M 26/49* | (2016.01) |
| *F02B 37/10* | (2006.01) |

(52) U.S. Cl.
CPC .......... *F02D 41/0052* (2013.01); *F02B 37/10* (2013.01); *F02B 37/24* (2013.01); *F02D 13/0246* (2013.01); *F02D 41/0007* (2013.01); *F02M 26/04* (2016.02); *F02M 26/34* (2016.02); *F02M 26/49* (2016.02); *F02D 2200/101* (2013.01)

(58) Field of Classification Search
CPC ...... F02B 39/10; F02B 37/24; F02D 41/0052; F02D 13/0246; F02D 41/0007; F02D 2200/101; F02M 26/49; F02M 26/34; F02M 26/04
See application file for complete search history.

(56) References Cited

U.S. PATENT DOCUMENTS

| | | |
|---|---|---|
| 6,256,993 B1 | 7/2001 | Halimi et al. |
| 6,347,619 B1 | 2/2002 | Whiting et al. |
| 6,415,600 B1 | 7/2002 | Lejon |
| 6,595,183 B1 | 7/2003 | Olofsson |
| 8,944,034 B2 | 2/2015 | Gingrich et al. |
| 9,080,523 B1 | 7/2015 | Ulrey et al. |
| 9,133,795 B2 | 9/2015 | Riley et al. |
| 9,534,542 B2 | 1/2017 | Ku et al. |
| 2005/0097888 A1* | 5/2005 | Miyashita ........... F02D 41/0007 60/602 |

(Continued)

*Primary Examiner* — Thomas Moulis
(74) *Attorney, Agent, or Firm* — Julia Voutyras; McCoy Russell LLP

(57) ABSTRACT

Methods and systems are provided for controlling boost pressure and exhaust gas recirculation in a split exhaust system. In one example, a first portion of exhaust may be routed from a cylinder to an exhaust turbine via a first exhaust valve and a second, remaining portion of exhaust may be routed as exhaust gas recirculation (EGR) via a second exhaust valve, the timing and lift of each of the first valve profile and the second valve profile adjusted based on boost error and EGR error. Further, motor torque from an electric motor may be supplied to the turbocharger to attain a desired boost pressure and a desired EGR flow.

20 Claims, 10 Drawing Sheets

(56) References Cited

U.S. PATENT DOCUMENTS

| | | | |
|---|---|---|---|
| 2006/0117740 A1* | 6/2006 | Okugawa | F02D 35/0023 60/285 |
| 2007/0101977 A1* | 5/2007 | Stewart | F02D 41/0007 123/679 |
| 2008/0216780 A1* | 9/2008 | Nakamura | F01L 1/3442 123/90.15 |
| 2009/0222188 A1* | 9/2009 | Igarashi | F02B 37/16 701/102 |
| 2011/0000470 A1* | 1/2011 | Roth | F02D 13/0249 123/568.11 |
| 2012/0297767 A1* | 11/2012 | Hofbauer | F02B 37/10 60/605.2 |
| 2013/0199179 A1* | 8/2013 | Kitsukawa | F02B 37/013 60/605.2 |
| 2014/0190458 A1 | 7/2014 | Gingrich et al. | |
| 2015/0316005 A1 | 11/2015 | Madison et al. | |
| 2015/0337850 A1* | 11/2015 | An | F02B 39/00 60/605.3 |
| 2016/0084177 A1* | 3/2016 | Baker | F02B 37/007 60/602 |
| 2016/0131046 A1* | 5/2016 | Leone | F02B 37/004 60/600 |
| 2016/0131054 A1* | 5/2016 | Ulrey | F01N 5/04 60/600 |
| 2016/0138466 A1* | 5/2016 | Ge | F02B 61/06 60/624 |
| 2016/0215736 A1 | 7/2016 | Millward | |
| 2016/0230648 A1* | 8/2016 | Sanchez Perez | F02B 37/10 |
| 2016/0290220 A1* | 10/2016 | Smiljanovski | F02B 37/007 |
| 2017/0159552 A1* | 6/2017 | Suzuki | F02B 37/11 |
| 2017/0321614 A1* | 11/2017 | Leone | F01N 3/18 |
| 2017/0335753 A1* | 11/2017 | Xiao | F02B 37/04 |
| 2018/0163675 A1* | 6/2018 | Oshita | F02B 33/00 |
| 2018/0170353 A1* | 6/2018 | Ulrey | B60W 20/15 |

* cited by examiner

| Exhaust system mode 401 | Valve timing 402 | Valve lift 403 | Electric motor 404 | Condition 405 |
|---|---|---|---|---|
| 1 | 1st valve (turbine) advanced rel to 2nd valve (EGR) | Lift 1st valve > Lift 2nd valve | Motoring or Generating | Motoring: Aggressive transient tip-in from low load to high load for improved boost<br><br>Generating: Transient tip-out from high load to low load for improved energy recovery |
| 2 | 2nd valve advanced rel to 1st valve | Lift 2nd valve > Lift 1st valve | Motoring or Generating | Motoring: Transient tip-in from low load to high load for improved EGR<br><br>Generating: Transient tip-out from high load to low load for improved EGR |
| 3 | 1st valve advanced rel to 2nd valve | Lift 2nd valve > Lift 1st valve | Motoring or Generating | Motoring: Transient tip-in from low load to high load for improved boost<br><br>Generating: Transient tip-out from high load to low load for improved boost |
| 4 | 2nd valve advanced rel to 1st valve | Lift 1st valve > Lift 2nd valve | Motoring or Generating | Motoring: Moderate transient tip-in from low load to high load for improved EGR<br><br>Generating: Aggressive transient tip-out from high load to low load for improved EGR |

FIG. 4

METHODS AND SYSTEMS FOR BOOST AND EGR CONTROL

FIELD

The present description relates generally to methods and systems for controlling boost pressure and exhaust gas recirculation in a split exhaust system.

BACKGROUND/SUMMARY

Engine systems may be configured with boosting devices, such as turbochargers, for providing a boosted aircharge and improving peak power outputs, fuel economy and emissions. Power from exhaust gas may be used to rotate the impeller blades of the turbine which in turn drives an intake compressor. By adjusting exhaust manifold flow through the turbine, higher boost pressures can be achieved, enabling more fresh air to be introduced into the engine cylinders. As a result, soot emissions are reduced and transient engine output power is improved.

A portion of the exhaust gas from upstream and/or downstream of the turbine may also be recirculated to an engine intake system, in a process referred to as exhaust gas recirculation (EGR), in order to effectively cool the combustion chamber, thereby reducing NOx formation and improving fuel efficiency. High pressure EGR (HP EGR) includes exhaust drawn from upstream of the turbine, and therefore is driven by the same exhaust manifold flow as an exhaust turbine. Since exhaust turbine and EGR systems share the same exhaust manifold, there may be interaction issues between the EGR passage and turbine passage which may result in an unsatisfactory transient response for both EGR flow and boost pressure.

Accordingly, various approaches have been developed to coordinate the operation of an exhaust turbine and an EGR system. In one example, as shown in U.S. Pat. No. 9,133,795, Riley et al. teaches a split exhaust system including each of a high pressure exhaust valve in communication with an exhaust turbine via a high pressure exhaust manifold and a low pressure exhaust valve in communication with an intake manifold turbine via a low pressure exhaust manifold. On an exhaust stroke, an initial pulse of high pressure exhaust may be delivered to the turbine via the high pressure exhaust valve and the high pressure exhaust manifold and then the remaining exhaust may be delivered on a subsequent pulse to the intake manifold as EGR via the low pressure exhaust valve and the low pressure exhaust manifold.

However, the inventors herein have recognized potential issues with such systems. As one example, during lower engine load conditions, when boost demand is lower while high pressure EGR demand is higher, it may not be possible to deliver the desired high pressure EGR via the low pressure exhaust valve and the low pressure exhaust manifold. As another example, during transient increases in engine load, such as during a tip-in, the exhaust flow via the turbine may not be sufficient to provide the desired boost pressure, thereby adversely affecting the engine's transient response. As still another example, during conditions when boost pressure and EGR is desired, an increase in the intake pressure relative to the exhaust pressure due to turbine operation can cause high pressure EGR flow from the exhaust manifold to the intake manifold to be significantly reduced. The issue can be exacerbated in turbochargers with electric assist where an electric motor is coupled to the turbocharger drive shaft to transiently increase the compressor output during a tip-in.

In one example, the issues described above may be addressed by a method for an engine comprising: operating an intake compressor with each of motor torque from an electric motor and mechanical torque from an exhaust turbine, flowing a first portion of exhaust from a cylinder to upstream of the compressor via a first exhaust valve while flowing a second, remaining portion of the cylinder exhaust to the turbine, and operating in a first mode with an opening and closing of the first exhaust valve advanced relative to an opening and closing of the second exhaust valve. In this way, by using a turbocharger with an electric assist device and by flowing exhaust to the turbine and to the intake manifold (as EGR) via distinct exhaust passages controlled by separate exhaust valves, desired boost pressure may be maintained while delivering the requested amount of EGR.

In one example, the exhaust manifold may be divided into two independent exhaust manifolds, each coupled to a distinct exhaust valve. A first exhaust manifold, coupled to a first exhaust valve, may deliver a first portion of exhaust to an exhaust turbine of a turbocharger, such as a variable geometry turbine (VGT), while a second exhaust manifold, coupled to a second exhaust valve, may deliver a second portion of exhaust to upstream of an intake compressor of the turbocharger as EGR. The ratio of exhaust flow via the first exhaust manifold (to turbine) relative to the second exhaust manifold (as EGR) may be adjusted by adjusting exhaust valve profiles (valve timing and valve lift) for the first exhaust valve and the second exhaust valve. In one example configuration, the turbocharger may be an electric turbocharger having an electric motor coupled to the turbocharger shaft between the exhaust turbine and the intake compressor. In an alternate configuration, the turbocharger may be included in a compound boosted system having an electric supercharger coupled to a bypass passage of the intake manifold, upstream of the turbocharger compressor. During conditions of increased boost demand, in addition to the boost provided by the exhaust turbine, the electric motor may be operated to provide electric boost assistance wherein positive motor torque is delivered to the intake compressor in order to meet the requested boost demand and EGR demand. During conditions of lower boost demand, the electric motor may be operated as a generator storing excess exhaust energy wherein negative motor torque is provided to decelerate the compressor and charge a system battery. Also, vanes of the VGT or the opening of a waste-gate passage coupled across the exhaust turbine may be adjusted to provide the desired boost pressure and EGR flow. During conditions when a boost error (that is, difference between target boost pressure and actual boost pressure) is higher relative to an EGR error (that is, difference between target EGR flow and actual EGR flow), the exhaust valve profiles may be adjusted to route a higher amount of exhaust via the turbine while reducing the amount of exhaust available as EGR. During conditions when the EGR error is higher relative to the boost error, the exhaust valve profiles may be adjusted to recirculate a higher amount of exhaust to upstream of the compressor while reducing the amount of exhaust routed to the exhaust turbine. Further, an opening of an EGR valve coupled to the EGR passage delivering exhaust from the second exhaust manifold to the intake manifold may be adjusted based on EGR demand. The number of cylinders supplying exhaust to the exhaust turbine and for EGR may also be adjusted based on boost error and EGR error.

In this way, by using a split exhaust system having distinct exhaust manifolds for supplying exhaust to upstream of the turbine and the intake compressor, interaction between the two exhaust flows may be reduced, thereby improving boost pressure and EGR delivery during transient engine operations. By using different exhaust valve profiles for controlling exhaust flow via the distinct exhaust manifolds, the cylinder pressure may be effectively used to drive exhaust flow to each of the exhaust turbine and the intake manifold. The technical effect of using an electric motor coupled to a shaft of the turbocharger is that in addition to reducing boost error, the electric motor may create a pressure difference across the EGR valve and operate as an EGR pump to improve EGR flow during transient operations. By opportunistically adjusting each of the duration of exhaust valve lift, the timing of exhaust valve lift, and the number of cylinders supplying exhaust to the turbine and the intake manifold, exhaust energy may be optimally used for providing boost while maintaining EGR supply during transient engine operations. Overall, by improving boost and EGR supply, fuel efficiency and emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a table illustrating the different modes of operation of the exhaust systems of FIGS. 1 and 2.

DETAILED DESCRIPTION

Figure 1:
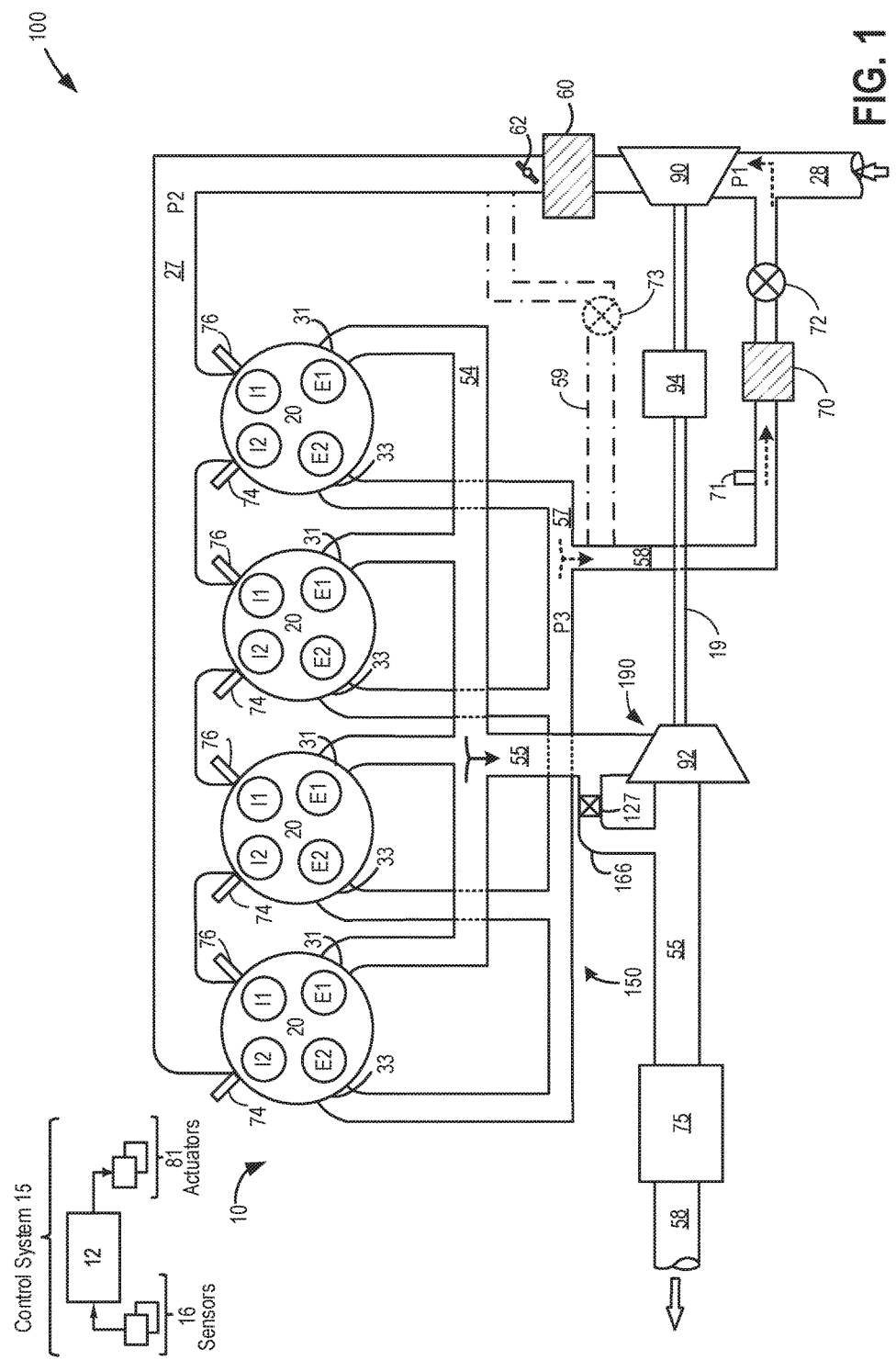
FIG. 1 shows a first embodiment of an example engine system with a split exhaust manifold and an electric assist device coupled to a turbocharger shaft.
Figure 2:
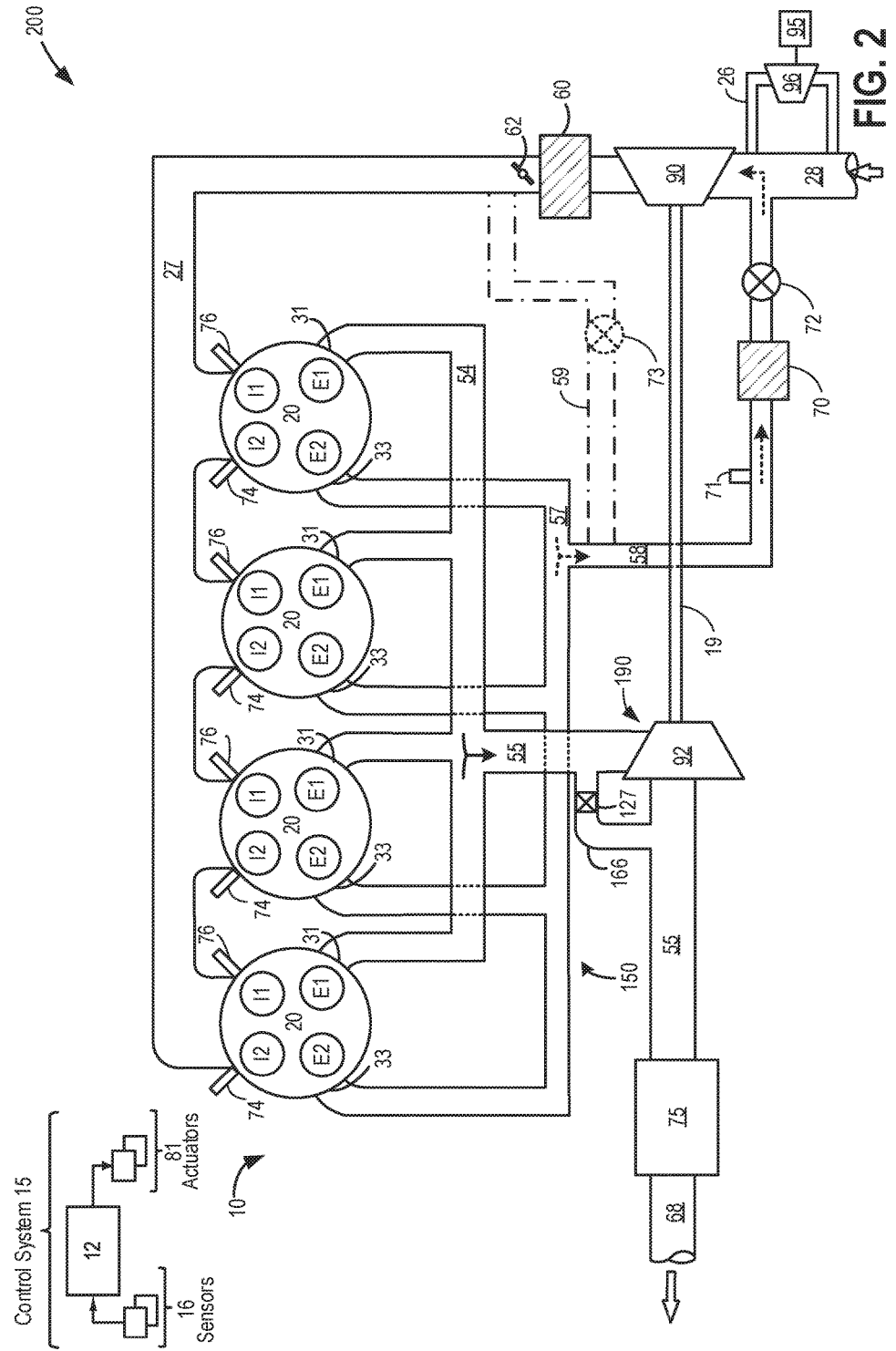
FIG. 2 shows a second embodiment of an example engine system with a split exhaust manifold and a supercharger compressor.
Figure 3:
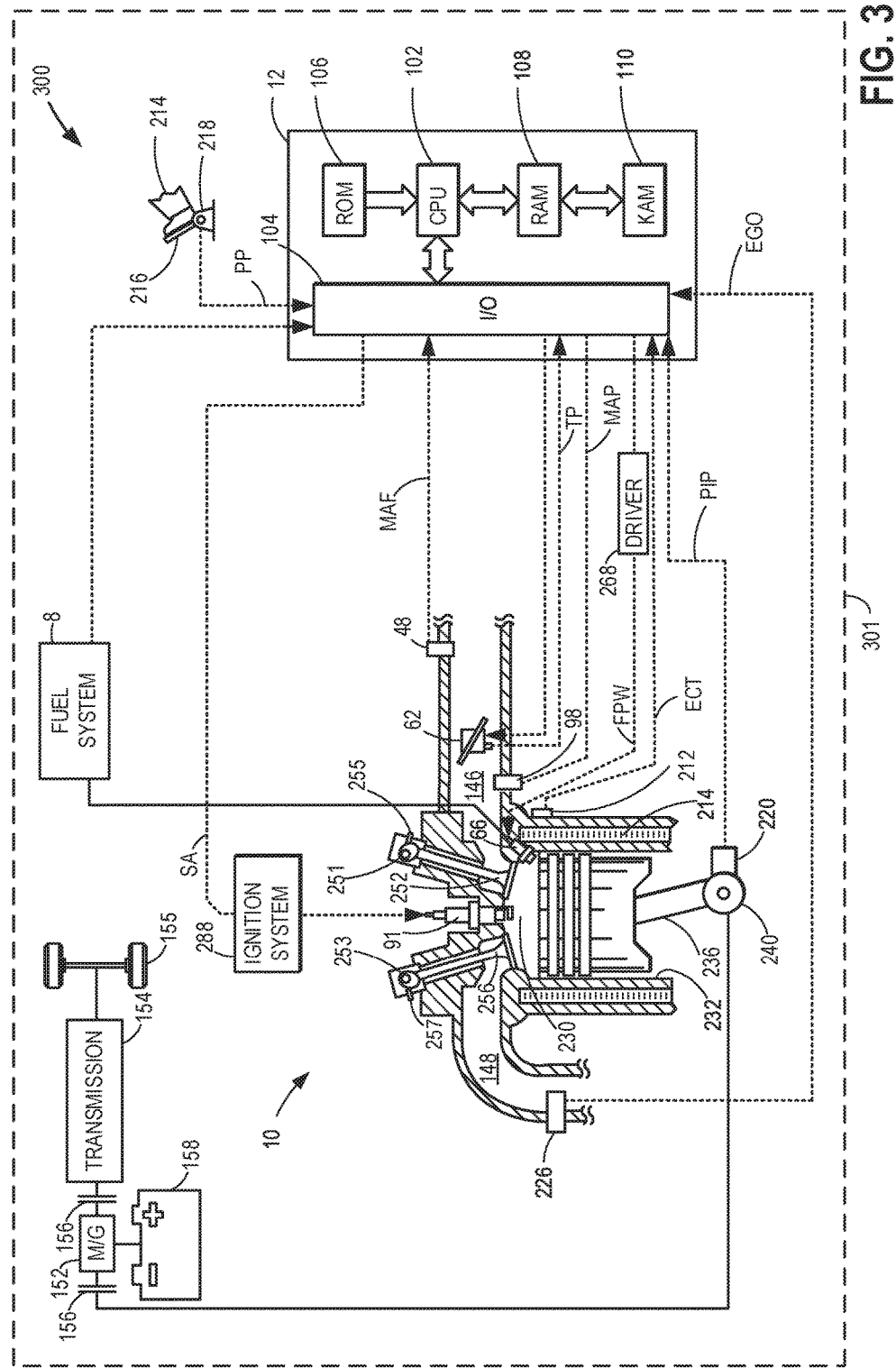
FIG. 3 shows a schematic depiction of a combustion chamber of the engine systems of FIGS. 1 and 2 in a hybrid vehicle.

The following description relates to systems and methods for coordinating boost pressure and exhaust gas recirculation in a split exhaust system. Example embodiments of an engine system comprising split exhaust systems coupled to distinct exhaust valves of the engine cylinders are shown in FIGS. 1-2. A first exhaust manifold of the split exhaust system may provide exhaust to an exhaust turbine while the second exhaust manifold of the split exhaust system may recirculate to upstream of an intake compressor. An example combustion chamber of the engine systems of FIGS. 1-2 coupled to a hybrid vehicle is shown in FIG. 3. The different modes of operation of an exhaust system of the engine systems of FIGS. 1-2 are tabulated in FIG. 4. The different modes of operation of the exhaust system may be based on engine speed-load conditions as illustrated in a map shown in FIG. 5. Examples of exhaust valve profiles for optimal exhaust supply for boost control and EGR flow are shown in FIGS. 6A-6D. An engine controller may be configured to perform control routines, such as the example routines of FIGS. 7-8 to select a mode of operation of the exhaust system and adjust each of exhaust valve profiles and electric motor operation to provide desired boost pressure and EGR flow. An example adjustment of exhaust valve profile to provide desired boost pressure and EGR flow is shown in FIG. 9.

FIG. 1 shows a schematic diagram of a first example embodiment 100 of a multi-cylinder internal combustion engine 10, which may be included in a propulsion system of an automobile. Engine 10 may include a plurality of combustion chambers (that is, cylinders) 20. In the depicted example, engine 10 includes four cylinders arranged in an in-line configuration. However, in alternate examples, engine 10 can include one or more cylinders such as 2, 3, 4, 5, 6, 8, 10 or more cylinders, arranged in alternate configurations, such as V-6, I-6, V-12, opposed 4, boxer, etc.

In the depicted embodiment, engine 10 is a boosted engine coupled to a turbocharger 190 including a compressor 90 driven by a turbine 92. Specifically, fresh air is introduced along intake passage 28 into engine 10 and flows to compressor 14. The compressor may be a suitable intake-air compressor, such as a motor-driven or driveshaft driven supercharger compressor. In the engine system 100, the compressor 90 is shown as a turbocharger compressor mechanically coupled to turbine 92 via a common shaft 19, the turbine 92 driven by expanding engine exhaust. As the turbine 92 is driven by exhaust, the compressor coupled to the turbine via the common shaft 19 may spin the intake compressor 90, thereby increasing air intake via the intake passage 28 and providing increased boost pressure. In one embodiment, the turbocharger may be a variable geometry turbocharger (VGT), where turbine geometry is actively varied as a function of engine speed and other operating conditions in order to provide a desired boost pressure. In another embodiment, the compressor and turbine may be coupled within a twin scroll turbocharger. Further, a wastegate 127 may be included in a bypass 166 coupled between an inlet and outlet of the exhaust turbine 92 to control an amount of exhaust gas delivered to the turbine. By increasing the opening of the wastegate 127, a higher portion of exhaust may be routed to the emissions control device 75 bypassing the turbine 92.

As shown in FIG. 1, compressor 90 is coupled, through charge air cooler (CAC) 60 to throttle valve (e.g., intake throttle) 62. The CAC may be an air-to-air or air-to-coolant heat exchanger, for example. Throttle valve 62 is coupled to engine intake manifold 22. The position of throttle 62 can be adjusted by control system 15 via a throttle actuator (not shown) communicatively coupled to controller 12. By modulating throttle 62, an amount of fresh air may be inducted from the atmosphere into engine 10 and delivered to the engine cylinders via intake passage 28. From the compressor 90, the hot compressed air charge enters the inlet of the CAC 60, cools as it travels through the CAC, and then exits to pass through the throttle valve 62 to the intake manifold 27.

An electric assist device 94 (also referred to herein as an electric motor) may be coupled to the shaft 19. The electric assist device may include a battery for storing electric charge. When the actual boost pressure is lower than a target boost pressure, the electric assist device 94 may be operated in an assist (motoring) mode, wherein electric energy from the battery of the electric assist device may be used to increase the rotational speed of each of the exhaust turbine and the intake compressor. In the assist mode, the intake compressor may be rotated at a higher speed relative to the exhaust turbine using positive motor torque generated from energy stored in the electric assist device battery. The increased rotational speed of the compressor 90 increases the amount of intake air entering the intake passage 28 and the intake manifold 27, consequently increasing boost pressure to the target pressure. When the actual boost pressure is higher than the target boost pressure, the electric assist device 94 may also be operated in a generating mode, wherein energy from the exhaust may be stored in the electric assist device battery. Instead of flowing a volume of exhaust via the waste-gate, a portion of the excess exhaust may be routed via the exhaust turbine 92. In the generating mode, excess mechanical energy may be converted to electrical energy and the state of charge of the electric assist device battery may be increased using negative motor torque from the electric motor to decelerate the compressor. The excess exhaust energy may be stored and utilized at a later time to operate the electric assist device in the assist mode to provide supplemental boost pressure, as required. In this way, operating the intake compressor 90 with motor torque includes operating with positive motor torque when actual boost pressure is below a target boost pressure and operating with negative motor torque when actual boost pressure is above the target boost pressure.

Exhaust gases exiting turbine 92 may pass through emission control device 75 as well. Emission control device 75 can include multiple catalyst bricks, in one example. In another example, multiple emission control devices, each with multiple bricks, can be used. In some examples, emission control device 75 may be a three-way type catalyst. In other examples, emission control device 75 may include one or a plurality of a diesel oxidation catalyst (DOC), and a selective catalytic reduction catalyst (SCR). After passing through emission control device 75, exhaust gas may be directed out to a tailpipe 68.

In FIG. 1, fuel injectors are shown coupled directly to the combustion chambers for injecting fuel directly therein in proportion to a pulse width of a signal FPW received from controller 12 via an electronic driver, for example. Each cylinder 20 is shown coupled with two injectors 74 and 76 per cylinder at each intake valve. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake manifold 27 in a configuration that provides what is known as port injection of fuel into the intake ports upstream of the respective combustion chambers. Though not shown in FIG. 1, fuel may be delivered to the fuel injectors by a fuel system including a fuel tank, a fuel pump, a fuel line, and a fuel rail. In some examples, a distributor-less ignition system (not shown) may provide an ignition spark to spark plugs (not shown) coupled to combustion chambers 20 in response to controller 12.

Each cylinder 20 of engine 10 may be configured to receive intake air from the intake manifold 27 via the air intake passage 28. Intake manifold 27 may be coupled to the combustion chambers via intake ports (not shown). Each intake port may supply air and/or fuel to the cylinder it is coupled to for combustion. Each cylinder intake port can selectively communicate with the cylinder via one or more intake valves. In the depicted example, each cylinder 20 is shown with two intake valves I1 and I2. In one example, an intake passage may be formed from intake manifold 27 selectively communicating with each intake valve. In another example, each of the two intake valves may be controlled to open at specific engine speeds and therefore, may communicate through a common intake port with the intake manifold.

Each combustion chamber may exhaust combustion gases via two exhaust ports coupled thereto. In the depicted example, each cylinder 20 is coupled to a first exhaust port 31 via a first exhaust valve E1, and to a second exhaust port 33 via a second exhaust valve E2. Each exhaust port of each cylinder may lead to different exhaust manifolds for channeling a first portion of exhaust gas and a second portion of exhaust gases separately. For example, each of the first exhaust ports 31 from each of the cylinders 20 may combine into a first exhaust manifold 54. From the first exhaust manifold 54, a first exhaust passage 55 may connect each of the first exhaust ports 31 (first exhaust valve) to the exhaust turbine 92. The bypass 166 with the waste-gate 127 may be coupled to the first exhaust passage 55 originating upstream of the turbine 92 and ending downstream of the turbine 92.

Similarly, each of the second exhaust ports 33 from each of the cylinders 20 may combine into a second exhaust manifold 57. A second exhaust passage 58 (also referred herein as EGR passage 58) may originate from the second exhaust manifold 57 connecting each of the second exhaust ports 33 (second exhaust valve) to the intake passage 28. The EGR passage 58 may be coupled to the intake passage 28 upstream of the compressor 90 thereby providing low pressure EGR. An EGR cooler 70 may be coupled to the EGR passage 58 to cool the exhaust before delivering it upstream of the compressor 90. EGR valve 72 coupled to the EGR passage 58 may be opened to admit a controlled amount of exhaust gas to the compressor inlet for desirable combustion and emissions control performance. EGR valve 72 may be configured as a continuously variable valve. In an alternate example, however, EGR valve 72 may be configured as an on/off valve. An EGR sensor 71 may be coupled to the EGR passage 58 to estimate EGR flow rate as exhaust flows through the EGR passage 58.

In an alternate embodiment, a high-pressure EGR passage 59 may originate from the second exhaust manifold 57 connecting each of the second exhaust ports 33 to the intake passage 28. The high-pressure EGR passage 59 may be coupled to the intake passage 28 downstream of the compressor 90. Each of an EGR valve 73, an EGR cooler, and an EGR sensor may be coupled high-pressure EGR passage 59.

In this way, each combustion chamber 20 may exhaust a first portion of combustion gases into first exhaust manifold 54 via a first exhaust valve E1, and exhaust a second portion of combustion gases into second exhaust manifold 57 via a second exhaust valve E2 of the same cylinder. Such an exhaust system including two exhaust manifolds, one manifold for routing the first portion of exhaust to the exhaust turbine, and the other manifold for routing exhaust to the intake manifold as EGR may be referred to herein as the split exhaust system 150 (herein also referred to as the exhaust system 150). By separating the first exhaust manifold 55 delivering exhaust to turbine 92 and the second exhaust manifold 57 delivering EGR, interaction between the two exhaust flows may be reduced, thereby improving control of boost pressure and EGR delivery during transient engine operations. In particular, the profile of the first and the second exhaust valves may be adjusted, such as valve lift and valve timing parameters, so as to vary an amount, pressure, and temperature of exhaust being delivered to the turbine relative to the intake manifold.

For example, the first exhaust valve E1 (also referred herein as first valve) channels the first portion of the exhaust gases through the first exhaust manifold 55 and first exhaust passage 55 to the turbine while the second exhaust valve E2 (also referred herein as second valve) channels the second portion of exhaust gases through second exhaust manifold 57 and EGR passage 58 to the intake passage 28. The exhaust valve profile for the first exhaust valve E1 including the timing and lift may be adjusted independent of, or in coordination with, the exhaust valve profile for the second exhaust valve E2 so as to enable boost control and EGR control concurrently.

As the first exhaust valve E1 and the second exhaust valve E2 are independently actuated with different valve profiles, the cylinder pressure may be effectively used to drive exhaust flow to each of the exhaust turbine 92 and the compressor 90 inlet. Due to independent actuation of the second valve E2, as shown by the relation (1) below, the pressure difference between the engine cylinder and the inlet of the intake compressor may be higher than the pressure difference between the second exhaust manifold 57 and the intake manifold 27 (downstream of compressor 90), thereby effectively driving exhaust via the EGR passage 58 to the compressor inlet (or outlet) during all engine operating conditions including transient conditions.

$$P_c - P_1 > P_3 - P_2 \quad (1)$$

where $P_c$ is the pressure in an engine cylinder 20, $P_1$ is the pressure at the inlet of the intake compressor 90, $P_3$ is the pressure at the second exhaust manifold 57, and $P_2$ is the pressure at the intake manifold 27. Also, by operating the electric assist device 94, a pressure difference may be created across the EGR valve 72, thereby improving exhaust flow from the second exhaust manifold 57 to the compressor 90 inlet.

The exhaust system 150 may be operated in a plurality of modes based on boost demand and EGR demand which in turn may be based on operator torque demand and engine operating conditions such as engine speed, engine temperature, and engine load. In each operating mode of the exhaust system, a timing and lift of each of the first exhaust valve E1 and the second exhaust valve E2 may be adjusted to provide the desired boost and EGR while generating positive or negative torque from the electric assist device 94. The different modes of operation of the exhaust system are elaborated with reference to FIGS. 3 and 4.

Engine 10 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include turbo-compressor inlet pressure and temperature sensors, and manifold air pressure (MAP) sensors located within the intake passage for estimating a boost pressure, and EGR sensor 71 coupled to the EGR passage 58 for estimating EGR flow-rate. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 3. As another example, actuators 81 may include fuel injectors, and throttle 62. Controller 12 may receive input data from the various sensors, process the input data, and trigger the actuators in response to the processed input data based on instruction or code programmed therein corresponding to one or more routines. Example control routines are described herein with respect to FIGS. 7-8.

An alternate embodiment of FIG. 1 is shown in FIG. 2 and elaborated below with reference to example engine system 200. All components of the engine system 200 may be identical to that of engine system 100 other than the electric assist device 95. The engine system 200 may include the split exhaust system 150 as described in FIG. 1. Components previously introduced in FIG. 1 are numbered similarly and not reintroduced. Similar to the embodiment of FIG. 1, engine system 200 of FIG. 2 may further include control system 15 for controlling engine operations.

As seen in FIG. 2, the turbocharger is not an electric turbocharger and does not have an electric assist device coupled to the common shaft 19 of the turbocharger. Instead, electric assistance is provided via an electric supercharger coupled to the turbocharger in a staged or compound boosted engine configuration. Specifically, supercharger compressor 96 may be coupled to a bypass 26 of the intake passage 28, upstream of the intake compressor. An electric assist device 95, such as an electric motor including a battery, may be coupled to the supercharger compressor 96. During higher boost demand, the supercharger compressor 96 may be operated to increase intake airflow thereby supplementing operation of the intake compressor. During operation of the supercharger compressor 96 to increase intake airflow, the electric assist device 95 may be operated in an assist mode, wherein electric energy from the battery of the electric assist device may be used to spin the supercharger compressor 96. During operation of the supercharger compressor 96, a pressure difference may be created across the EGR valve 72, thereby improving exhaust flow from the exhaust to the intake passage 28. In this way, the supercharger compressor 96 and electric assist device 95 may operate as an EGR pump to improve EGR flow during transient operations.

Referring to FIG. 3, it depicts a partial view 300 of a single cylinder of internal combustion engine 10 coupled to a vehicle 301. As such, components previously introduced in FIG. 1 are represented with the same reference numbers and are not re-introduced.

Engine 10 is depicted with combustion chamber (cylinder) 230, coolant sleeve 214, and cylinder walls 232 with piston 236 positioned therein and connected to crankshaft 240. Combustion chamber 20 is shown communicating with intake passage 146 and exhaust passage 148 via respective intake valve 252 and exhaust valve 256. As previously described in FIG. 1, each cylinder of engine 10 may exhaust combustion products along two conduits. In the depicted view 200, exhaust passage 148 represents the first exhaust port leading from the cylinder to the turbine (such as exhaust port 33 of FIG. 1) while the second exhaust passage leading to the exhaust gas recirculation passage is not visible in this view.

As also previously elaborated in FIG. 1, each cylinder of engine 10 may include two (or more) intake valves and two (or more) exhaust valves. In the depicted view 200, intake valve 252 and exhaust valve 256 are located at an upper region of combustion chamber 20. Intake valve 252 and exhaust valve 256 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve 252 is controlled by an intake cam 251 and each exhaust valve 256 is controlled by an exhaust cam 253. The position of intake valve 252 and exhaust valve 256 may be determined by valve position sensors 255 and 257, respectively.

In alternate embodiments, the intake and/or exhaust valve may be controlled by electric valve actuation. For example, cylinder 20 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 251 includes separate and different cam lobes that provide different valve profiles (e.g., valve timing, valve lift, duration, etc.) for each of the two intake valves of combustion chamber 20. Likewise, exhaust cam 253 may include separate and different cam lobes that provide different valve profiles (e.g., valve timing, valve lift, duration, etc.) for each of the two exhaust valves of combustion chamber 20. In another example, intake cam 251 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve just before BDC (bottom dead center) of the power stroke of combustion chamber 20 and close the same exhaust valve well before top dead center (TDC) to selectively exhaust blowdown gases from the combustion chamber. Further, a second exhaust cam profile can be positioned to open from close a second exhaust valve at about the mid-point of the exhaust stroke and close it before TDC to selectively exhaust the scavenging portion of the exhaust gases.

Continuing with FIG. 3, exhaust gas sensor 226 is shown coupled to exhaust passage 148. Sensor 226 may be positioned in the exhaust passage upstream of one or more emission control devices, such as device 75 of FIG. 1. Sensor 226 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

In some embodiments, each cylinder of engine 10 may include a spark plug 91 for initiating combustion. Ignition system 288 can provide an ignition spark to combustion chamber 20 via spark plug 91 in response to spark advance signal SA from controller 12, under select operating modes. However, in some embodiments, spark plug 91 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 20 is shown including one fuel injector 66. Fuel injector 66 is shown coupled directly to combustion chamber 20 for injecting fuel directly therein in proportion to the pulse width of signal FPW received from controller 12 via electronic driver 268. In this manner, fuel injector 66 provides what is known as direct injection (hereafter also referred to as "DI") of fuel into combustion cylinder 20. While FIG. 2 shows injector 66 as a side injector, it may also be located overhead of the piston, such as near the position of spark plug 91. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 20.

Fuel may be delivered to fuel injector 66 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 8 may hold fuel with different fuel qualities, such as different fuel compositions. These differences may include different alcohol content, different octane, different heat of vaporizations, different fuel blends, and/or combinations thereof etc. In some embodiments, fuel system 8 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Controller 12 is shown in FIG. 3 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 212 coupled to coolant sleeve 214; a profile ignition pickup signal (PIP) from Hall effect sensor 220 (or other type) coupled to crankshaft 240; throttle position (TP) from a throttle position sensor; absolute manifold pressure signal (MAP) from sensor 98, cylinder AFR from EGO sensor 226, and abnormal combustion from a knock sensor and a crankshaft acceleration sensor. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Engine speed signal, RPM, may be generated by controller 12 from signal PIP. Manifold pressure signal MAP from a manifold pressure sensor may be used to provide an indication of vacuum, or pressure, in the intake manifold. The storage medium read-only memory 106 can be programmed with computer readable data representing non-transitory instructions executable by the processor 102 for performing the methods described below as well as other variants that are anticipated but not specifically listed. As described above, FIG. 2 shows one cylinder of a multi-cylinder engine, and each cylinder may similarly include its own set of intake/exhaust valves, fuel injector, spark plug, etc.

Based on input from one or more of the above-mentioned sensors, controller 12 may adjust one or more actuators, such as fuel injector 66, throttle 62, spark plug 91, intake/exhaust valves and cams, etc. The controller 12 receives signals from the various sensors of FIG. 3 and employs the various actuators of FIG. 3 to adjust engine operation based on the received signals and instructions stored on a memory of the controller 12. In one example, in response to a boost pressure demand and relative EGR demand, the controller may send a signal to the exhaust valves supplying exhaust to turbine to adjust the exhaust valve profiles (including the timing and lift of the exhaust valves) relative to the exhaust valve profiles of the exhaust valves supplying exhaust to the intake passage.

In some examples, vehicle 301 may be a hybrid vehicle with multiple sources of torque available to one or more vehicle wheels 155. In other examples, vehicle 301 is a conventional vehicle with only an engine, or an electric vehicle with only electric machine(s). In the example shown, vehicle 301 includes engine 10 and an electric machine 152. Electric machine 152 may be a motor or a motor/generator. Crankshaft 240 of engine 10 and electric machine 152 are connected via a transmission 154 to vehicle wheels 155 when one or more clutches 156 are engaged. In the depicted example, a first clutch 156 is provided between crankshaft 240 and electric machine 152, and a second clutch 156 is provided between electric machine 152 and transmission 154. Controller 12 may send a signal to an actuator of each clutch 156 to engage or disengage the clutch, so as to connect or disconnect crankshaft 240 from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 158 to provide torque to vehicle wheels 155. Electric machine 152 may also be operated as a generator to provide electrical power to charge traction battery 158, for example during a braking operation. In one example, battery 158 may supply power to a hydraulic system and/or an electric motor for operation of the lifting mechanism. In another example, a separate on-board battery (different from traction battery 158), charged using engine power may supply power to a hydraulic system and/or an electric motor for operation of the lifting mechanism.

In this way, the components of FIGS. 1-3 enable a system for a vehicle comprising: an engine including a cylinder, a turbocharger including an intake compressor, an exhaust turbine, and an electric motor, wherein the intake compressor is driven via one or more of the turbine and the motor, a split exhaust system including a first exhaust passage selectively coupled to a first exhaust valve of the cylinder and a second exhaust passage selectively coupled to a second exhaust valve of the cylinder, the first exhaust passage flowing exhaust from the cylinder to the exhaust turbine, the second exhaust passage recirculating exhaust from the cylinder to upstream of the intake compressor. The engine system may further include a controller with computer-readable instructions for: operating the engine system in a first mode with an opening of the first exhaust valve advanced relative to the opening of the second exhaust valve and with the electric motor providing positive motor torque to the compressor, operating the engine system in a second mode with the opening of the second exhaust valve advanced relative to the opening of the first exhaust valve and with the electric motor providing positive motor torque to the compressor, operating the engine system in a third mode with the opening of the first exhaust valve advanced relative to the opening of the second exhaust valve and with the electric motor providing negative motor torque to the compressor, and operating the engine system in a fourth mode with the opening of the second exhaust valve advanced relative to the opening of the first exhaust valve and with the electric motor providing negative motor torque to the compressor.

FIG. 4 shows a table 400 illustrating a plurality of operational modes of the engine exhaust system (such as exhaust system 150 in FIGS. 1-2). The exhaust system may be operated in a plurality of modes by adjusting timing and lift of a first exhaust valve (such as the first exhaust valve E1 in FIGS. 1-2) of a cylinder delivering a first portion of exhaust from the cylinder to the turbine relative, to the timing and lift of a second exhaust valve (such as the second exhaust valve E2 in FIGS. 1-2) of the cylinder delivering a second, remaining portion of the cylinder exhaust to upstream of a compressor via an exhaust gas recirculation (EGR) passage. The modes of operation of the exhaust system may be based on engine operating conditions such as engine speed and load and a state of charge of an electric motor (such as electric assist device 94 in FIG. 1 and the electric assist device 95 in FIG. 2) coupled to the engine system.

The first column 401 of table 400 shows the exhaust system operating mode. The second column 402 shows the timing of the first exhaust valve (first valve) relative to the timing of the second exhaust valve (second valve). The third column 403 shows the lift of the first valve relative to the lift of the second valve. The fourth column 404 shows the operational state of the electric motor. The fifth column 405 shows the engine operating condition during which an exhaust system may be operated at a specific mode.

Row 406 shows operation of the exhaust system in a first mode. Operating in the first mode includes advancing the opening of the first valve relative to the opening of the second valve along and increasing the lift of the first valve relative to the lift of the second valve. In the first operating mode, the electric motor may be operated in a motoring mode, or a generating mode. In the motoring mode, positive torque from the motor is applied to the intake compressor to increase boost pressure while in the generating mode, negative torque from the motor is applied to the intake compressor to decrease the speed of the compressor while increasing the state of charge of the battery coupled to the electric motor. During operation in the motoring mode, the actual boost pressure may be lower than the target boost pressure and the energy from the battery supplying power to the electric motor may be used to increase the boost pressure to the target level and during operation in the generating mode, the actual boost pressure may be higher than the target boost pressure and the excess exhaust energy may be stored as battery charge for future use. In one example, while the electric motor is operated in the motoring mode, the exhaust system may be operated in a first mode during aggressive transient tip-in from lower engine load to higher engine load for improved boost. In another example, while the electric motor is operated in the generating mode, the exhaust system may be operated in a first mode during aggressive transient tip-out from higher load to lower load for improved energy recovery and boost pressure while providing the desired EGR mass flow rate.

Figure 6A:
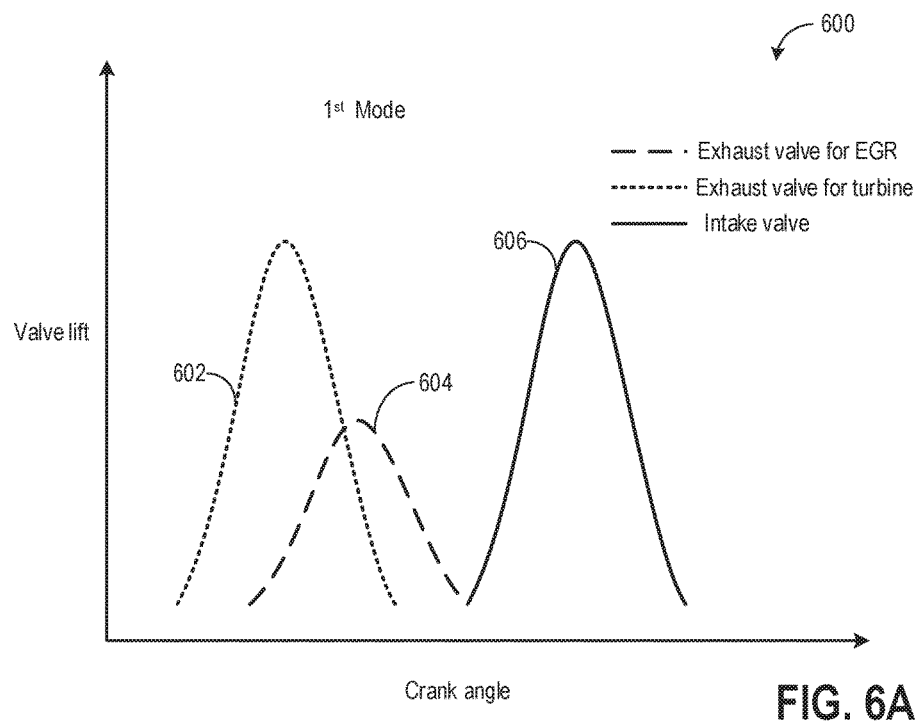
FIG. 6A shows a first example exhaust valve profile.

FIG. 6A shows a plot 600 of exhaust valve profiles during operation in the first mode. The dotted line 602 denotes the opening of the first valve for supplying exhaust to the turbine. The dashed line 604 denotes the opening of the second valve for supplying exhaust to the EGR delivery passage. The solid line 606 denotes opening of each of the intake valves of the cylinders.

In the first operating mode, the first valve may be opened first supplying a first portion of exhaust to the turbine to maintain boost pressure. By supplying the exhaust first to the exhaust turbine, the turbine response time may be reduced while maintaining the desired boost pressure. In order to increase exhaust supply to the turbine for providing the desired boost, the lift of the first valve may be higher compared to the lift of the second valve. Due to the higher lift, a larger portion of exhaust may flow to the turbine causing the exhaust turbine and consequently the intake compressor to spin at a higher speed, thereby increasing intake air flow. The remaining, lower, amount of exhaust flowing through the second valve may be supplied to the intake manifold to maintain the desired EGR flow. Once each of the first valve and the second valve are closed, the intake valves may be lifted.

Row 408 shows operation of the exhaust system in a second mode. Operating in the second mode includes, advancing the opening of the second valve relative to the opening of the first valve along and increasing the lift of the second valve relative to the lift of the first valve. In the second operating mode, the electric motor may be operated in a motoring mode or a generating mode. In one example, while the electric motor is operated in the motoring mode, the exhaust system may be operated in a second mode during a transient tip-in from lower engine load to higher engine load when a higher EGR flow is desired while maintaining the desired boost pressure. In another example, while the electric motor is operated in the generating mode, the exhaust system may be operated in a second mode during a transient tip-out from higher engine load to lower engine load when a higher EGR flow is desired while maintaining the desired boost pressure.

Figure 6B:
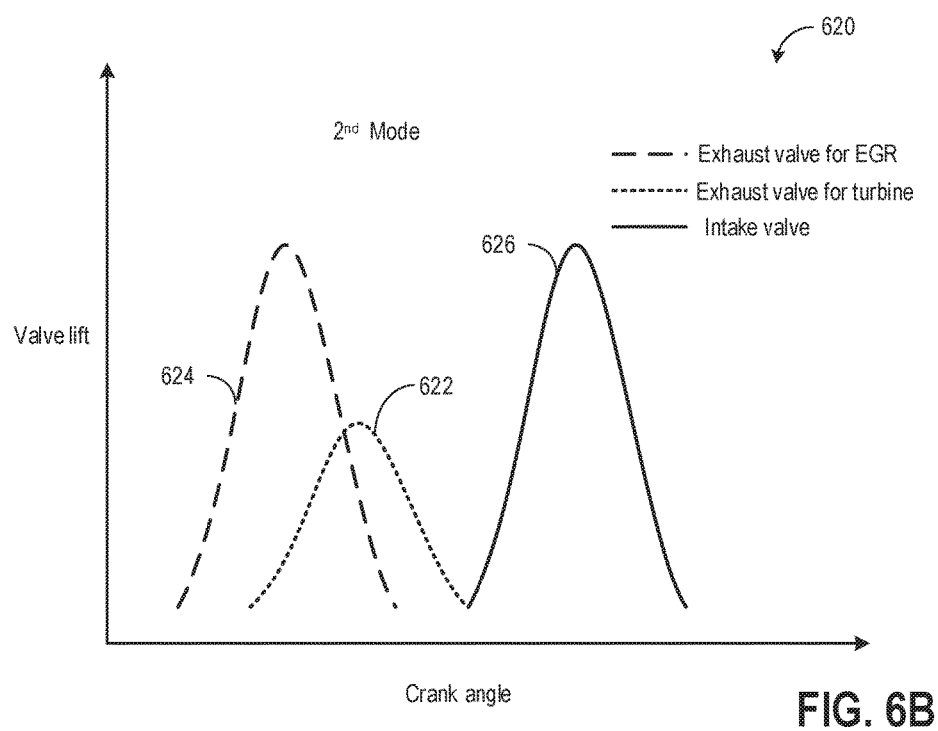
FIG. 6B shows a second example exhaust valve profile.

FIG. 6B shows a plot 620 of exhaust valve profiles during operation in the second mode. The dotted line 622 denotes the opening of the first valve for supplying exhaust to the turbine. The dashed line 624 denotes the opening of the second valve for supplying exhaust to the EGR delivery passage. The solid line 626 denotes opening of each of the intake valves of the cylinders.

In the second operating mode, the second valve may be opened first supplying a first portion of exhaust to the EGR passage to meet the desired EGR level. Due to a higher EGR error relative to boost error, the lift of the second valve may be increased compared to the lift of the first valve supplying exhaust to the turbine in order to supply a higher amount of exhaust as EGR. By supplying a higher amount exhaust first to the EGR passage, the EGR response time may be reduced and the desired EGR flow may be provided. Due to the lower lift of the first valve compared to the lift of the second valve, a smaller portion of exhaust may flow to the turbine in order to maintain the desired boost pressure while providing the desired EGR flow. Once each of the first valve and the second valve are closed, the intake valves may be lifted.

Row 410 shows operation of the exhaust system in a third mode. Operating in the third mode includes, advancing the opening of the first valve relative to the opening of the second valve and increasing the lift of the second valve relative to the lift of the first valve. In the second operating mode, the electric motor may be operated in the motoring mode or the generating mode. In one example, while the electric motor is operated in the motoring mode, the exhaust system may be operated in a third mode during a transient tip-in from lower engine load to higher engine load for improved boost. In another example, while the electric motor is operated in the generating mode, the exhaust system may be operated in a third mode during a transient tip-out from higher engine load to lower engine load for improved boost and energy recovery while maintaining the desired EGR mass flow rate.

Figure 6C:
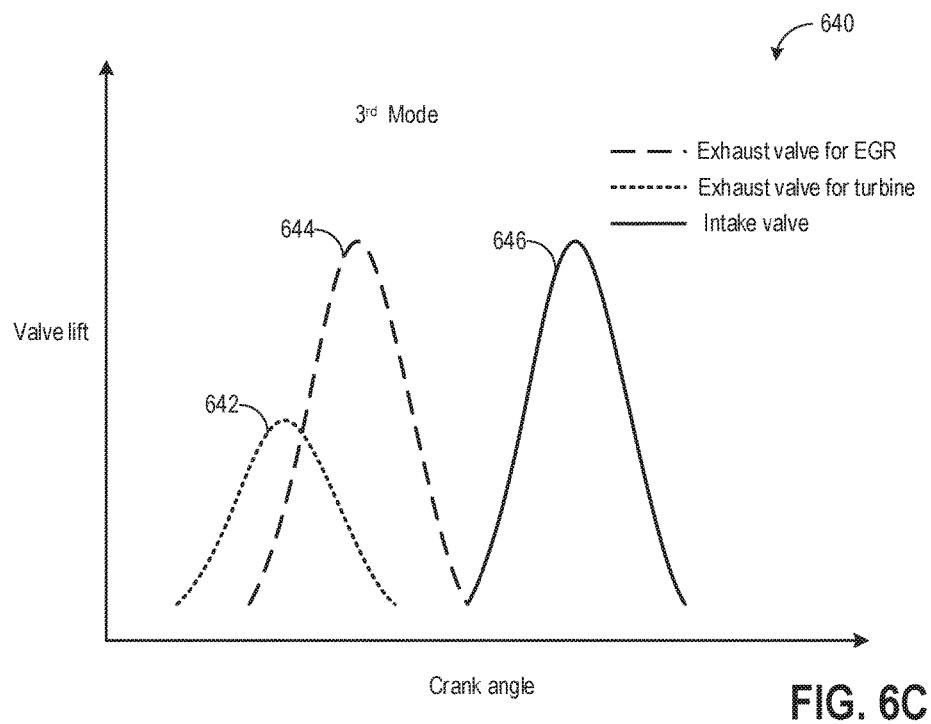
FIG. 6C shows a third example exhaust valve profile.

FIG. 6C shows a plot 640 of exhaust valve profiles during operation in the third mode. The dotted line 642 denotes the opening of the first valve for supplying exhaust to the turbine. The dashed line 644 denotes the opening of the second valve for supplying exhaust to the EGR delivery passage. The solid line 646 denotes opening of each of the intake valves of the cylinders.

In the third operating mode, the first valve may be opened first supplying a first portion of exhaust to the turbine to maintain boost pressure. By first supplying the exhaust to the exhaust turbine, the turbine response time may be reduced while maintaining the desired boost pressure. The lift of the second valve may be higher compared to the lift of the first valve. Due to the higher lift, a larger (second, remaining) portion of exhaust may flow to the EGR delivery passage and then on to the intake manifold via the second valve. Once each of the first valve and the second valve are closed, the intake valves may be lifted.

Row 412 shows operation of the exhaust system in a fourth mode. Operating in the fourth mode includes, advancing the opening of the second valve relative to the opening of the first valve along and increasing the lift of the first valve relative to the lift of the second valve. In the fourth operating mode, the electric motor may be operated in the motoring mode or the generating mode. In one example, while the electric motor is operated in the motoring mode, the exhaust system may be operated in a fourth mode during a moderate transient tip-in from lower engine load to higher engine load for improved EGR mass flow rate. In another example, while the electric motor is operated in the generating mode, the exhaust system may be operated in a fourth mode during an aggressive transient tip-out from higher engine load to a lower engine load for improved EGR mass flow rate while continuing to recover energy.

Figure 6D:
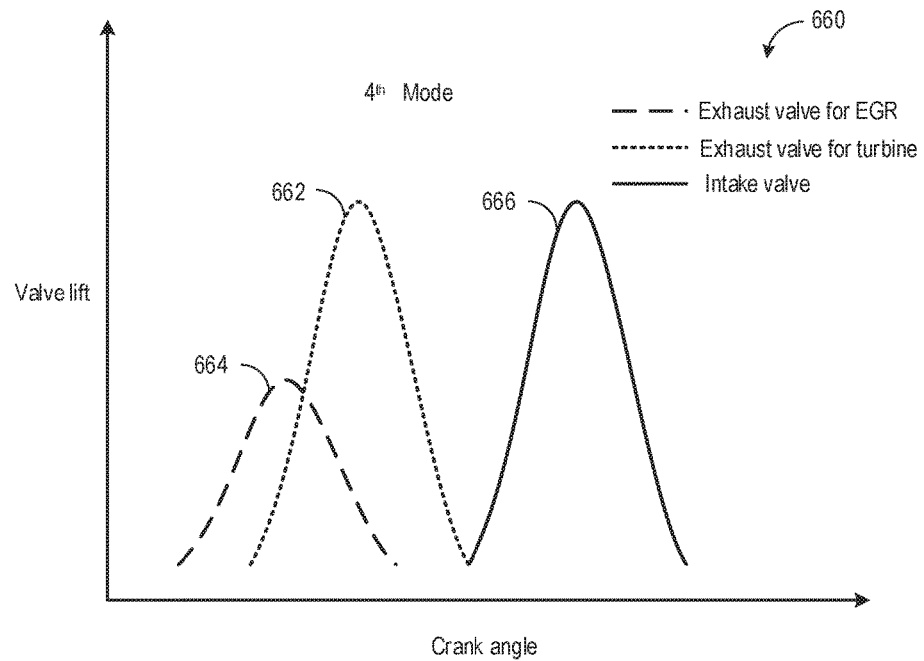
FIG. 6D shows a fourth example exhaust valve profile.

FIG. 6D shows a plot 660 of exhaust valve profiles during operation in the fourth mode. The dotted line 662 denotes the opening of the first valve for supplying exhaust to the turbine. The dashed line 664 denotes the opening of the second valve for supplying exhaust to the EGR delivery passage. The solid line 666 denotes opening of each of the intake valves of the cylinders.

In the fourth operating mode, the second valve may be opened first supplying a first portion of exhaust to the EGR passage to meet the desired EGR level. By supplying the exhaust first to the EGR passage, the EGR response time may be reduced and the desired EGR flow may be provided. Due to the higher lift of the first valve, a larger portion of exhaust may flow to the turbine and a lower amount of exhaust flowing through the second valve may be supplied to the intake manifold to obtain the desired EGR flow. Once each of the first valve and the second valve are closed, the intake valves may be lifted.

Figure 5:
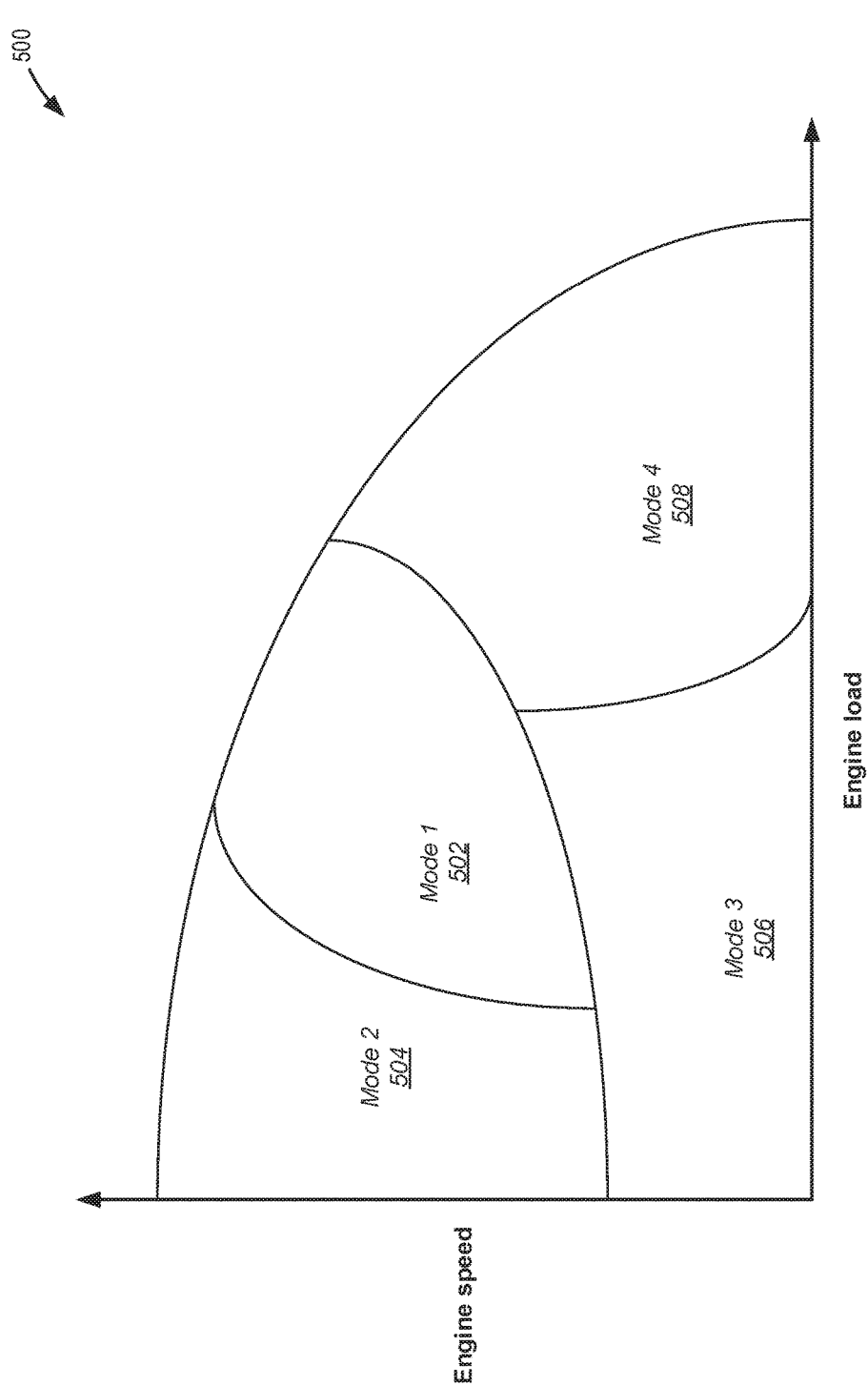
FIG. 5 shows a map illustrating the different modes of operation of the exhaust system at different engine speed-load regions.

FIG. 5 shows a map 500 illustrating the different modes of operation of the exhaust system as a function of engine speed-load regions. Based on engine operating conditions such as engine speed and engine load, and further based on a state of charge of an electric motor battery coupled to an intake compressor, the controller may select an operating mode for the exhaust system, the selected mode enabled by adjusting a timing and lift of a first exhaust valve of a cylinder delivering a first portion of exhaust from the cylinder to the turbine relative to the timing and lift of a second exhaust valve of the cylinder delivering a second, remaining portion of the cylinder exhaust to upstream of a compressor via an exhaust gas recirculation (EGR) passage. The x-axis of map 500 denotes engine load and the y-axis denotes engine speed.

In one example, the exhaust system may be operated in the first mode (such as mode 1 of FIG. 4) with an opening and closing of the first exhaust valve advanced relative to an opening and closing of the second exhaust valve and the lift of the first exhaust valve increased relative to the lift of the second exhaust valve during engine operation in higher engine load and higher engine speed conditions as defined by region 502. By providing more boost at high engine speed-load conditions, engine output may be increased thereby improving engine performance.

In another example, the exhaust system may be operated in a second mode (such as mode 2 in FIG. 4) with an opening and closing of the second exhaust valve advanced relative to an opening and closing of the first exhaust valve and the lift of the second exhaust valve increased relative to the lift of the first exhaust valve during engine operation in lower engine load and higher engine speed conditions as defined by region 504. By providing more EGR at low engine load and high engine speed conditions, fuel economy, emissions quality, and combustion stability may be improved.

In yet another example, the exhaust system may be operated in a third mode (such as mode 3 in FIG. 4) with an opening and closing of the first exhaust valve advanced relative to an opening and closing of the second exhaust valve and the lift of the second exhaust valve increased relative to the lift of the first exhaust valve during engine operation in lower engine load and lower engine speed conditions as defined by region 506. By first providing boost and then providing more EGR at low engine speed-load conditions, engine performance may be increased while improving fuel economy and emissions quality.

In a further example, the exhaust system may be operated in a fourth mode (such as mode 4 in FIG. 4) with an opening and closing of the second exhaust valve advanced relative to an opening and closing of the first exhaust valve and the lift of the first valve increased relative to the lift of the second valve during engine operation in higher engine load and lower engine speed conditions as defined by region 508. By providing more boost at high engine load conditions, engine output may be increased.

Figure 7:
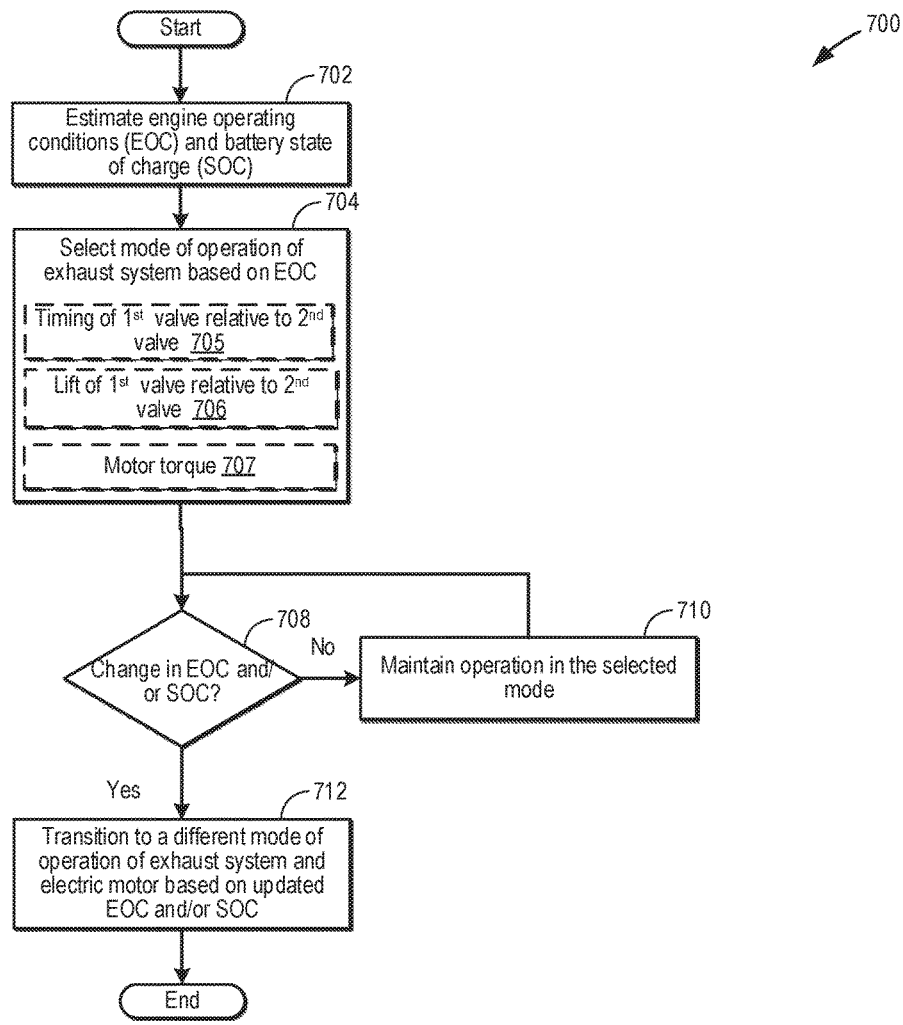
FIG. 7 shows a flow chart illustrating an example method that can be implemented to select an operating mode of the split exhaust system.

FIG. 7 shows an example method 700 for selecting an operating mode of an engine exhaust system (such as exhaust system 150 in FIGS. 1-2). As tabulated in table 400 in FIG. 4, the exhaust system may be operated in one of four modes based on engine operating conditions. Instructions for carrying out method 700 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 702, current vehicle and engine operating conditions may be estimated and/or measured. These may include, for example, operator torque demand, engine speed, vehicle speed, engine temperature, engine load, boost pressure, exhaust temperature, manifold pressure, manifold air flow, etc. The controller may also determine a state of charge (SOC) of a battery coupled to an electric motor (such as the electric assist device 94 in FIG. 1) which is coupled to a shaft of a turbocharger. Alternatively, the controller may also determine a state of charge of a battery coupled to an electric motor (such as the electric assist device 95 in FIG. 3) of a supercharger compressor (such as the supercharger compressor 96 in FIG. 1) housed in an intake bypass passage. Further, ambient conditions such as ambient temperature and ambient humidity may be determined based on inputs from one or more engine sensors.

At 704, a mode of operation of the exhaust system may be selected based on the current engine operating conditions including engine speed, engine temperature, and engine load. As an example, a desired boost pressure may be estimated based on estimated on engine operating conditions including engine load, engine speed, and engine temperature. For example, the controller may determine the desired boost pressure through a determination that directly takes into account each of the engine load, the engine speed, the engine temperature, such as increasing the desired boost pressure with increase in one or more of the engine load, the engine speed, the engine temperature. The controller may alternatively determine the desired boost pressure based on a calculation using a look-up table with the input being each of the engine load, the engine speed, the engine temperature, and the output being the amount of desired boost pressure.

Also, a desired EGR flow may be estimated based on estimated on engine operating conditions including engine load, engine speed, and engine temperature. In yet another example, the controller may make a logical determination regarding the desired EGR flow based on logic rules that are a function of engine load, engine speed, and engine temperature. In another example, the controller may determine the desired EGR flow based on a calculation using a look-up table with the input being engine speed, and engine temperature and the output being desired EGR flow.

A profile of a first valve coupled to a first exhaust passage flowing a first portion of exhaust from a cylinder to an exhaust turbine and a profile of a second valve coupled to a second exhaust passage recirculating a second, remaining portion of the exhaust from the cylinder to an engine intake may be adjusted based on engine boost demand and EGR demand. By adjusting the timing and the amount of lift of the first valve relative to that of the second valve, the first portion of exhaust may be adjusted relative to the second portion. Adjustment of the first portion relative to the second portion may be based on each of an EGR error between the actual EGR flow relative to the desired EGR flow, and a boost error between the actual boost pressure and the desired boost pressure. As the first exhaust valve may be selectively coupled to the exhaust passage and not to the EGR passage, and the second exhaust valve may be selectively coupled to the EGR passage and not coupled to the exhaust passage, exhaust may be independently routed to the turbine and to the intake manifold (as EGR) via separate exhaust valves and a desired boost pressure may be maintained while delivering the requested amount of EGR.

Selecting a mode of operation of the exhaust system includes, at 705, selecting a timing of the first valve supplying exhaust to the turbine relative to the timing of a second valve supplying exhaust to the EGR passage. In one example, if boost error is higher than EGR error, in order to first supply exhaust to the turbine, the timing of opening of the first valve may be advanced relative to the timing of opening of the second valve. In another example, if EGR error is higher than boost error, in order to first supply exhaust to the intake compressor, the timing of opening of the second valve may be advanced relative to the timing of opening of the first valve. In order to operate the exhaust system with the first valve timing advanced relative to the second valve timing, the exhaust system may be operated in one of the first mode (as discussed in row 406 in FIG. 4) and the third mode (as discussed in row 410 in FIG. 4). In order to operate the exhaust system with the second valve timing advanced relative to the first valve timing, the exhaust system may be operated in one of the second mode (as discussed in row 408 in FIG. 4) and the fourth mode (as discussed in row 412 in FIG. 4).

Selecting a mode of operation of the exhaust system also includes at 706, selecting an amount of lift of the first valve supplying exhaust to the turbine relative to the amount of lift of the second valve supplying exhaust to the EGR passage. In one example, if boost error is higher than EGR error, in order to supply a higher amount of exhaust to the turbine, the amount of lift of the first valve may be increased relative to the amount of lift of the second valve. In another example, if EGR error is higher than boost error, in order to supply a higher amount of exhaust to the intake compressor, the amount of lift of the second valve may be increased relative to the amount of lift of the first valve. In order to operate the exhaust system with the first valve having a higher lift relative to the second valve, the exhaust system may be operated in one of the first mode (as discussed in row 406 in FIG. 4) and the fourth mode (as discussed in row 412 in FIG. 4). In order to operate the exhaust system with the second valve having a higher lift relative to the first valve, the exhaust system may be operated in one of the second mode (as discussed in row 408 in FIG. 4) and the third mode (as discussed in row 410 in FIG. 4).

Selecting a mode of operation of the exhaust system further includes at 707, selecting a mode of operation of the electric motor to provide a desired motor torque. Motor torque supplied to the intake compressor may be adjusted based on each of the state of charge (SOC) of the electric motor battery, the boost error, and the EGR error. In one example, if the battery SOC is higher than a threshold and the actual boost pressure being lower than the desired boost pressure, the electric motor may be operated in a motoring mode with positive torque being delivered to the compressor such that the boost pressure error may be reduced. Electric energy from the electric motor battery may be used to increase the rotational speed of the intake compressor, thereby increasing boost pressure. Similarly, if the battery SOC is higher than a threshold and the actual EGR flow being lower than the desired EGR flow, the electric motor may be operated in a motoring mode with positive torque being delivered to the compressor such that a pressure difference is created across the EGR valve to improve EGR flow and reduce the EGR error.

In another example, if the battery SOC is lower than a threshold and the actual boost pressure is higher than the desired boost pressure, the electric motor may be operated in a generating mode with negative torque being delivered to the compressor such that the boost pressure error may be reduced while the SOC of the battery may be increased. Excess mechanical energy from the rotation of the turbocharger may be converted to electrical energy and the state of charge of the electric motor battery may be increased.

At 708, the routine includes determining if there is a change in engine operating conditions that necessitates a change in boost pressure or EGR flow. In one example, engine load may increase in response to an accelerator pedal tip-in event. In another example, engine temperature may increase in response to engine operation for a longer than threshold duration at a higher than threshold (such as higher than idling) engine speed. Also, the routine may include determining if there is a change in the SOC of the electric motor battery. If the electric motor has been operated in the motoring mode, as electrical energy from the battery is converted to mechanical energy used for providing positive torque to the compressor, the battery SOC may decrease to below a threshold and the battery may be desired to be recharged.

If it is determined that there is no significant change in the engine operating conditions and the SOC of the electric motor battery, at 710, the exhaust system and the electric motor may be continued to be operated in the selected mode. However, if it is determined that there is a change in engine operating conditions and/or the SOC of the electric motor battery, at 712, the exhaust system may be transitioned to be operated in a different mode based on the updated engine operating condition and/or the battery SOC. As the engine operating conditions change, the target boost pressure and/or the target EGR flow may change. Transitioning between operating in the first, second, third, and fourth mode may be based on each of a boost error between actual boost pressure and updated target boost pressure and an EGR error between actual EGR flow and updated target EGT flow.

In one example, in response to a decrease in the SOC of the motor battery and an aggressive transient tip-out from a higher engine load condition to a lower engine load condition, the exhaust system may be transitioned from operating in the third mode to operating in the first mode. In another example, in response a moderate transient tip-in from a lower engine load condition to a higher engine load condition without any significant decrease in the SOC of the motor battery, the exhaust system may be transitioned from operating in the second mode to operating in the fourth mode.

Figure 8:
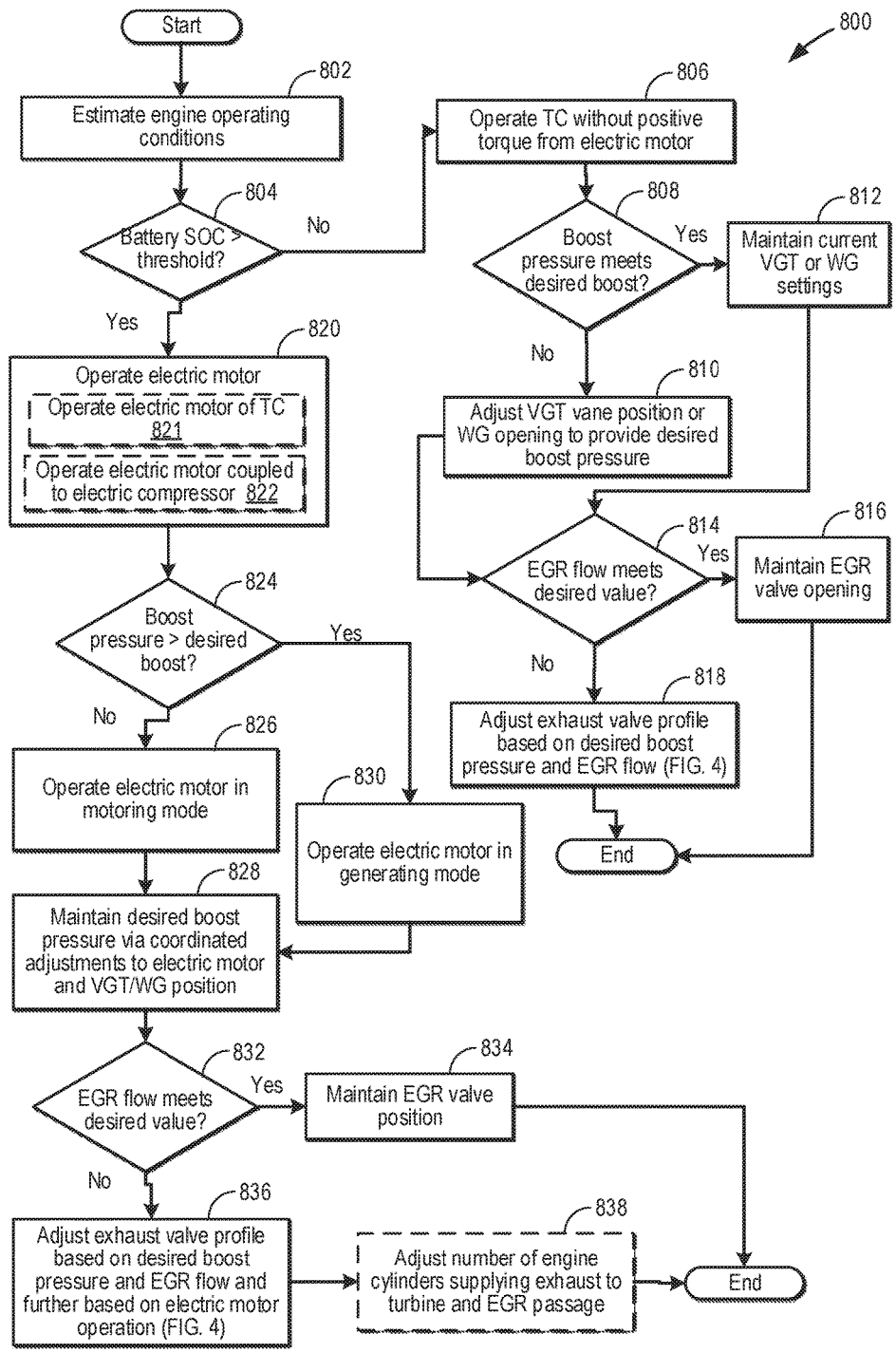
FIG. 8 shows a flow chart illustrating an example method that can be implemented to adjust operation of each of an electric motor, a wastegate, and an exhaust valve profile for boost pressure and EGR flow control.
Figure 9:
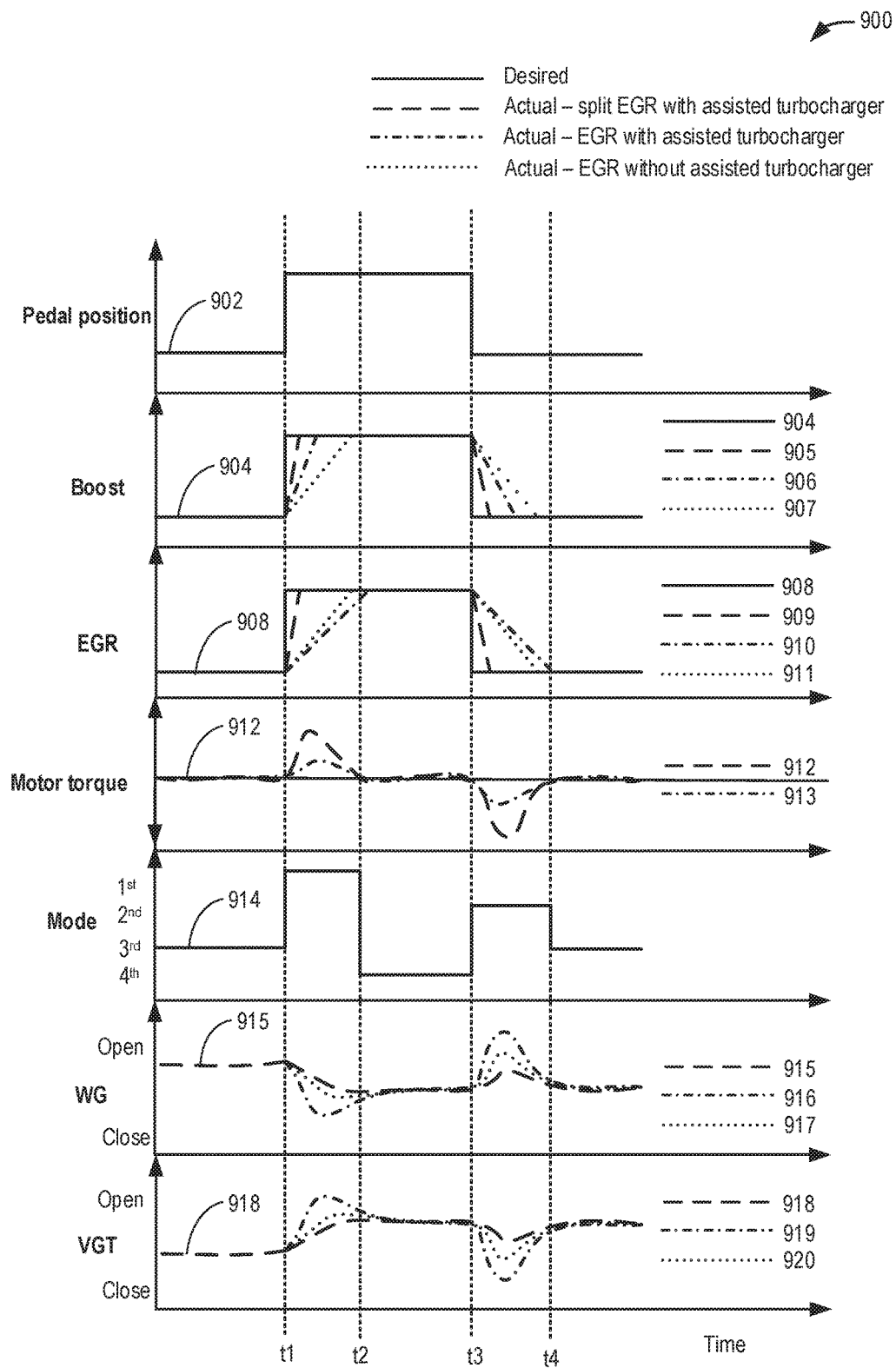
FIG. 9 shows an example adjustment of exhaust valve profiles for controlling boost pressure and EGR flow, according to the present disclosure.

FIG. 8 shows an example method 800 for adjusting operation of each of an electric motor, a waste-gate and an exhaust valve profile to obtain each of a target boost pressure and a target EGR flow.

At 802, current vehicle and engine operating conditions may be estimated and/or measured. These may include, for example, operator torque demand, engine speed, vehicle speed, engine temperature, engine load, boost pressure, exhaust temperature, manifold pressure, manifold air flow, etc. The controller may also determine a state of charge (SOC) of a battery coupled to an electric motor (such as the electric assist device 94 or 95 in FIGS. 1 and 2 respectively) coupled to a shaft of a turbocharger or a supercharger compressor. Further, ambient conditions such as ambient temperature and ambient humidity may be determined based on inputs from one or more engine sensors.

At 804, the routine includes determining if the SOC of the battery of the electric motor is higher than a threshold SOC. The threshold SOC may be the minimum battery SOC desired for operating the electric motor in a motoring mode wherein a positive torque may be applied to the intake compressor. The positive torque applied on the compressor may cause the actual boost pressure to increase and consequently decrease boost error to decrease.

If it is determined that the battery SOC is lower than the threshold, at 806, it may be determined that the turbocharger may be operated without assistance (positive torque) from the electric motor. Therefore, boost pressure may not be increased by operating the electric motor of the turbocharger or the supercharger compressor. Therefore, at 806, the turbocharger may be operated without application of positive torque from the electric motor. In one example, the electric motor may be operated in a generating mode, wherein mechanical energy from the turbocharger may be used to increase the SOC of the electric motor battery. In another example, the electric motor may not be operated and may be maintained in an off state.

At 808, the routine includes determining if the actual (current) boost pressure at the intake manifold meets the desired boost pressure. The actual boost pressure may be estimated via inputs from an intake manifold pressure sensor. As described previously, the controller may determine the desired boost pressure based on engine operating conditions including engine load, engine speed, engine temperature, etc.

If it is determined that the actual boost pressure meets the desired boost pressure (such as the actual boost pressure is substantially equal to the desired boost pressure), at 812, the current setting of the exhaust variable geometry turbine (VGT) or the wastegate may be maintained. As such, the orientation of the impeller blades (or vanes) of the turbine may be maintained at the current setting to provide the desired boost or the opening of the wastegate may not be adjusted to increase or decrease the flow of exhaust gas via the exhaust turbine. Further, exhaust valve profiles may be maintained at the current setting to maintain the boost pressure.

In one example, if there is excess exhaust energy after providing the desired boost pressure, the electric motor may be operated in a generating mode to recharge the electric motor battery. Excess mechanical energy from rotation of the turbine may be converted to electrical energy and the state of charge of the electric assist device battery may be increased.

If it is determined that the actual boost pressure does not meet the desired boost pressure, at 810, one of the VGT vane position and the wastegate opening may be adjusted to provide the desired boost pressure. The controller may adjust a vane angle of the VGT or the opening of the wastegate based on a difference between the actual boost pressure and the desired boost pressure. The controller may determine one of the vane angle of the VGT and the wastegate opening based on a calculation using a look-up table with the input being the difference between the actual boost pressure and the desired boost pressure and the output being one of the vane angle of the VGT and the wastegate opening. In one example, if the desired boost pressure is higher than the actual boost pressure, the controller may adjust a vane angle of the VGT or decrease the wastegate opening to flow a higher amount of exhaust via the turbine. As the exhaust flow via the turbine increases, the rotational speed of the turbocharger compressor may correspondingly increase, thereby increasing the boost pressure in the intake manifold. In another example, if the desired boost pressure is lower than the actual boost pressure, the controller may adjust a vane angle of the VGT or increase the wastegate opening to decrease the flow of exhaust via the turbine. As the exhaust flow via the turbine decreases, the rotational speed of the turbocharger compressor may correspondingly decrease, thereby decreasing the boost pressure in the intake manifold.

At 814, the routine includes determining if the actual exhaust gas recirculation (EGR) flow from the exhaust manifold to the intake manifold meets the desired value. The actual amount of EGR flow (flow rate) may be determined based on input from an EGR sensor (such as sensor 71 in FIG. 1) coupled to the EGR delivery passage. The controller may determine the desired EGR flow based on engine operating conditions including engine load, engine speed, engine temperature, etc. For example, the controller may determine the desired EGR flow through a determination that directly takes into account each of the engine load, the engine speed, the engine temperature, such as increasing the desired EGR flow with increase in one or more of the engine load, the engine speed, and the engine temperature. The controller may alternatively determine the desired EGR flow based on a calculation using a look-up table with the input being each of the engine load, the engine speed, the engine temperature, and the output being the amount of desired EGR flow.

If it is determined that the actual EGR flow meets the desired value (such as the actual EGR flow is substantially equal to the desired EGR flow), at 816, the current EGR valve position (opening) may be maintained to allow the desired amount of EGR to flow from the exhaust to the intake manifold. Also, the exhaust valve profile including the order of opening of each of the first exhaust valve supplying exhaust to the turbine (such as exhaust valve E1 in FIGS. 1-2) and the second exhaust valve supplying exhaust to the EGR delivery passage (such as exhaust valve E2 in FIGS. 1-2) and an amount of lift of the each of the first and the second exhaust valves may be maintained.

If it is determined that the actual EGR flow does not meet the desired EGR flow, at 818, exhaust valve profile may be adjusted to deliver the desired amount of EGR. In one example, order of opening of each of the first set of exhaust valves and the second set of exhaust valves and an amount of lift of the each of the first set and the second set of exhaust valves may be adjusted based on desired EGR flow and desired boost pressure. Also, in order to increase EGR flow, the opening of the EGR valve may be increased. Details of adjustments to the exhaust valves for providing each of the desired EGR flow and the desired boost pressure is discussed in FIGS. 4 and 7.

Returning to step 804, if it is determined that the SOC of the battery of the electric motor is higher than the threshold SOC, at 820, the electric motor may be operated in either the motoring mode or the generating mode to provide each of a desired boost pressure and a desired EGR flow. Operating the electric motor includes, at 821, operating the electric motor coupled to the shaft of the turbocharger. During operation of the electric motor in a motoring (assist) mode, energy from the device may be used to increase boost pressure and during operation of the electric motor in a generating mode, energy from exhaust may be used to recharge the battery coupled to the electric assist device. Operating the electric motor may also include, at 821, operating the electric motor coupled to the supercharger compressor to increase the amount of intake air entering the intake manifold, thereby increasing boost pressure. Also, by operating the electric motor, a pressure difference may be created across the EGR valve, thereby improving exhaust flow from the exhaust to the intake manifold. In this way, the electric motor may operate as an EGR pump to improve EGR flow during transient operations.

At 824, the routine includes determining if the actual boost pressure is higher than the desired boost pressure. If it is determined that the actual boost pressure is higher than the desired boost pressure, at 830, the electric motor may be operated in the generating mode. In the generating mode, excess energy from the exhaust may be used to increase the state of charge of the battery of the electric assist device. As it is confirmed that the actual boost pressure is higher than the desired boost pressure, the actual boost pressure may be reduced to the desired boost pressure while providing the energy from the exhaust to recharge the battery of the electric motor. Negative motor torque is provided to decelerate the compressor and charge a system battery. In this way, the excess exhaust energy may be stored and utilized at a later time to operate the electric motor in the motoring mode to provide additional boost, as required.

If it is determined that the actual boost pressure is lower than the desired boost pressure, at 626, the electric motor may be operated in the motoring mode. As such, energy (positive torque) from exhaust flowing through the exhaust turbine may spin the turbine and consequently spin the intake compressor, thereby facilitating air intake via the intake manifold and the compressor. In the motoring mode, electric energy from the electric motor may be used to increase the rotational speed of the intake compressor. The increased rotational speed of the compressor increases the amount of intake air entering the intake manifold, consequently increasing boost pressure. In the assist mode, for the electric motor coupled to the supercharger compressor, electric energy from the electric motor may be used to spin the supercharger compressor to increase the amount of air intake by the turbocharger compressor. During operation of the supercharger compressor, the turbocharger compressor may be simultaneously operated to take in ambient air into the intake manifold. By increasing the air intake, the boost pressure in the intake manifold may be increased.

At 828, the desired boost pressure may be maintained by coordinated adjustments to one or more of the output of the electric motor, the position of the VGT, and the wastegate opening. Also, from step 830, the routine may proceed to step 828 to maintain the desired boost pressure by carrying out adjustments to the output of the electric motor, the VGT vane position, and the wastegate opening. In one example, when the electric motor is operated in the generating mode, after meeting the desired boost pressure, the excess exhaust energy may be used to increase the SOC of the battery of the electric assist device. During the charging of the battery, the opening of the wastegate may be decreased to allow a higher amount of exhaust gas to flow through the turbine thereby increasing the rotational speed of the turbine. Also, the VGT vane angle may be adjusted to allow a larger amount of exhaust gas to flow through the turbine. The excess energy produced by the turbine may rotate the shaft of the turbocharger at a higher speed and the excess energy may be used to increase the SOC of the electric assist device battery. Once the SOC of the battery increases to a threshold SOC and no further energy may be stored in the electric assist device, the wastegate opening may be increased or the VGT vane angle may be adjusted to decrease the exhaust flow via the turbine. The exhaust flow via the turbine may be regulated to maintain the desired boost pressure without providing excess energy.

In another example, when the electric motor is used in the motoring mode, the opening of the wastegate may be decreased or the VGT vane angles may be adjusted allow a higher amount of exhaust to flow through the turbine thereby increasing the rotational speed of the turbine. By spinning the turbine at a higher speed, the rotational speed of the intake compressor may be increased to increase boost pressure. By increasing the boost pressure by adjusting wastegate opening or VGT vane positions, a lower amount of energy from the electric motor may be used to increase the compressor speed to the desired speed to decrease boost error and to maintain the desired boost pressure. In this way, energy usage of the electric motor may be reduced and the device may be used in the motoring mode for a longer duration.

At 832, the routine includes determining if the EGR flow from the exhaust manifold to the intake manifold meets the desired value (such as the actual EGR flow is substantially equal to the desired EGR flow). If it is determined that EGR flow meets the desired value, at 834, the current EGR valve position (opening) may be maintained to allow the desired amount of EGR to flow from the exhaust to the intake manifold. Also, the exhaust valve profile including the order of opening of each of the first exhaust valve supplying exhaust to the turbine and the second valve supplying exhaust to the EGR delivery passage and an amount of lift of the each of the first and the second exhaust valves may be maintained.

If it is determined that the actual EGR flow does not meet the desired EGR flow, at 836, exhaust valve profile may be adjusted to deliver the desired amount of EGR. In one example, order of opening of each of the exhaust valve and the second exhaust valve and an amount of lift of the each of the first and the second exhaust valves may be adjusted based on desired EGR flow and desired boost pressure. Also, in order to increase EGR flow, the opening of the EGR valve may be increased. The exhaust valve profiles may be further adjusted based on the current VGT position, wastegate opening, and electric motor. Details of adjustments to the exhaust valves for providing each of the desired EGR flow and the desired boost pressure is discussed in FIGS. 4 and 7.

At 838, the number of cylinders supplying exhaust to the exhaust turbine and to the EGR passage may also be adjusted based on each of boost error and EGR error. The controller may determine the number of cylinders supplying exhaust for EGR and the number of cylinders supplying exhaust to the turbine based on boost error relative to the EGR error. In one example, in response to a higher boost error relative to EGR error, a first valve (supplying exhaust to the turbine) coupled to a first number of engine cylinders may be opened to supply exhaust to the turbine, while a second valve (supplying exhaust to the EGR passage) coupled to a second number of engine cylinders may be opened to supply EGR. The first number of engine cylinders may be the total number of engine cylinders while the second number of engine cylinders may be lower than the first number of engine cylinders. In cylinders in which the second valve is not opened to supply EGR, the entire exhaust may be routed to the turbine via the first valve, thereby increasing exhaust flow via the turbine which consequently reduces boost error. In another example, in response to a higher EGR error relative to boost error, a second valve (supplying exhaust to the EGR passage) of the first number of engine cylinders may be opened to supply EGR while the first valve (supplying exhaust to the turbine) of the second number of engine cylinders may be opened to supply exhaust to the turbine. In cylinders in which the first valve is not opened to supply exhaust to the turbine, the entire exhaust may be routed as EGR via the second valve, thereby reducing EGR error while maintaining desired boost pressure.

In this way, a first portion of exhaust may be recirculated from a cylinder to an engine intake, upstream of an intake compressor, via an EGR passage while a second, remaining portion of the exhaust may be routed from the cylinder to the exhaust turbine, via an exhaust passage; and a motor torque delivered to the compressor via an electric motor may be adjusted based on each of an error between actual EGR and target EGR, an error between actual boost pressure and target boost pressure, and a state of charge of electric motor battery.

FIG. 9 shows an example operating sequence 900 illustrating adjusting adjustment of exhaust valve profile to provide each of a desired boost pressure and an exhaust gas recirculation (EGR) flow. The horizontal (x-axis) denotes time and the vertical markers t1-t4 identify significant times in engine operation during which the exhaust valve profile is adjusted to maintain the desired boost pressure and EGR flow.

The first plot, line 902, shows a position of an accelerator pedal. The second plot, solid line 904, shows a desired boost pressure level as estimated based on engine operating conditions including engine load, engine speed, and engine temperature. Dashed line 905 shows an actual boost pressure as estimated based on input from an intake manifold air pressure sensor. Dash and dot line 906 shows a possible boost pressure in a system including a turbocharger with an electric assist device (assisted turbocharger) but without a split exhaust. Dotted line 907 shows a possible boost pressure in a system without a split exhaust and without an assisted turbocharger. The third plot, solid line 908, shows a desired EGR flow as estimated based on engine operating conditions including engine load, engine speed, and engine temperature. Dashed line 909 shows an actual EGR flow as estimated based on input from an EGR sensor. Dash and dot line 910 shows a possible EGR flow in a system including a turbocharger with an electric assist device (assisted turbocharger) but without a split exhaust. Dotted line 911 shows a possible EGR flow in a system without a split exhaust and without an assisted turbocharger. The fourth plot, line 912, shows a motor torque applied on an intake compressor during operation of the electric motor in the motoring state and in the generating state. Dash and dot line 913 shows a possible boost pressure in a system including a turbocharger with an electric assist device (assisted turbocharger) but without a split exhaust. The fifth plot, line 914, shows a mode of operation of the engine exhaust system (such as exhaust system 150 in FIGS. 1-2). The exhaust system may be operated in a plurality of modes by adjusting timing and lift of a first exhaust valve (such as the first exhaust valve E1 in FIGS. 1-2) of a cylinder delivering a first portion of exhaust from the cylinder to the turbine relative to the timing and lift of a second exhaust valve (such as the second exhaust valve E2 in FIGS. 1-2) of the cylinder delivering a second, remaining portion of the cylinder exhaust to upstream of a compressor via an exhaust gas recirculation (EGR) passage. The sixth plot, dashed line 915, shows an actual degree of opening wastegate (valve) enabling exhaust flow via a wastegate passage bypassing the exhaust turbine. Dash and dot line 916 shows a possible degree of opening of wastegate in a system including an assisted turbocharger but without a split exhaust. Dotted line 917 shows a possible degree of opening of a wastegate in a system without a split exhaust and without an assisted turbocharger. As an example, instead of having a wastegate passage, the engine system may include a variable geometry exhaust turbine (VGT). The seventh plot, dashed line 918, shows a degree of opening of a VGT. Dash and dot line 919 shows a possible degree of opening of the VGT in a system including an assisted VGT but without a split exhaust. Dotted line 920 shows a possible degree of opening of the VGT in a system without a split exhaust and without an assisted VGT.

Prior to time t1, the pedal position remains substantially constant. In order to maintain the desired boost pressure and EGR flow, the engine exhaust system is operated in the third mode wherein the first valve suppling exhaust to the turbine is opened first to supply a first portion of exhaust to the turbine to maintain boost pressure and then the second valve supplying exhaust to the EGR passage is opened. The lift of the second valve is higher compared to the lift of the first valve. Due to the higher lift, a larger (second, remaining) portion of exhaust is supplied as EGR. Positive torque or negative torque from the motor is not desired during this time and the electric motor is maintained in a deactivated condition. Due to the lower boost demand, the wastegate valve is opened to route a portion of exhaust supplied from the first valve of the cylinder via the wastegate passage, bypassing the turbine. In an alternate embodiment, the vanes of the VGT are substantially closed to reduce expansion of exhaust at the turbine, thereby reducing boost pressure.

At time t1, in response to a tip-in, there is an increase in each of the desired boost pressure and the desired EGR flow. Between time t1 and t2, during the transient tip-in period, in order to provide the desired boost pressure and the EGR flow, the controller sends a signal to the cam actuation systems to transition operation of the engine exhaust system from the third mode to the first mode. In the first mode, the first valve suppling exhaust to the turbine is opened first to supply a first portion of exhaust to the turbine to maintain boost pressure and then the second valve supplying exhaust to the EGR passage is opened. The lift of the first valve is higher compared to the lift of the second valve. Due to the higher lift, a larger portion of exhaust is supplied to attain the desired boost pressure. The motor is operated in the motoring state, supplying positive torque to the compressor, thereby increasing the actual boost pressure to meet the desired boost pressure. Also, due to application of the positive torque on the compressor inlet, the pressure difference created across the EGR valve increases EGR flow during the transient operation. Compared to an engine system without the split exhaust, as shown by lines 912 and 913, in the presence of the split exhaust system, a higher amount of motor torque is effectively used to attain the desired boost pressure and the EGR flow, thereby improving response time and engine performance.

Due to the split exhaust system and the operation of the electric motor in the motoring state, each of the desired boost pressure and the desired EGR flow is achieved within a shorter duration. As an example, if the engine does not have a split exhaust system with separate and independently actuatable exhaust valves supplying exhaust to turbine and to the EGR passage, as shown by dash and dot lines 906 and 910, during the transient tip-in period, there may be a delay in providing each of the desired boost pressure and the desired EGR flow. Similarly, if the engine does not have a split exhaust system and an assisted turbocharger, as shown by dotted lines 907 and 911, there may be delays in providing each of the desired boost pressure and the EGR flow. Between time t1 and t2, the slope of the dashed line 905 is steeper than the corresponding lines 906 and 907 and also, the slope of the dashed line 909 is steeper than the corresponding lines 910 and 911. Therefore, by using an assisted turbocharger along with the split exhaust system, desired boost pressure and EGR flow may be provided within a shorter time during transient tip-in conditions as compared to engine systems without a split exhaust and without an assisted turbocharger. Also, between time t1 and t2, as shown by dashed lines 915 and 918 respectively, the opening of the wastegate or the VGT is adjusted to maintain the desired exhaust flow via the turbine. If the engine does not have a split exhaust system, as shown by dash and dot lines 916 and 919, during the transient tip-in, the opening of the wastegate may have to be decreased or the opening of the VGT may have to be increased compared to the corresponding degree of opening for an engine system with a split exhaust system and an assisted turbocharger. Similarly, if the engine does not have a split exhaust system and an assisted turbocharger, as shown by dotted lines 917 and 920, during the transient tip-in, the opening of the wastegate may have to be decreased or the opening of the VGT may have to be increased compared to the corresponding degree of opening for an engine system with a split exhaust system and an assisted turbocharger. Actuating (decreasing or increasing) the openings of the wastegate or the VGT to a larger extent may require a longer response time resulting in a delay in attainment of the desired boost pressure.

At time t2, in response to the transient tip-in being stabilized and the desired boost pressure and EGR flow being attained, in order to maintain the desired boost pressure and EGR flow, the controller sends a signal to the cam actuation systems to transition operation of the engine exhaust system from the first mode to the fourth mode. In the fourth mode, the second valve suppling exhaust to the EGR passage is opened first to supply a first portion of exhaust as EGR to maintain the desired EGR flow and then the first valve supplying exhaust to the turbine is opened. The lift of the first valve is higher compared to the lift of the second valve. Due to the higher lift, a larger portion of exhaust is supplied to maintain the desired boost pressure. Between time t2 and t3, since there is no change in each of the pedal position, the desired boost pressure, and the desired EGR flow, positive torque or negative torque from the motor is not desired during this time and the electric motor is maintained in a deactivated condition. Also, the opening of the wastegate or the VGT is maintained in the current state.

At time t3, in response to a tip-out, there is a decrease in each of the desired boost pressure and the desired EGR flow. Between time t3 and t4, during the transient tip-out period, in order to provide the decreased boost pressure and the EGR flow, the controller sends a signal to the cam actuation systems to transition operation of the engine exhaust system from the fourth mode to the second mode. In the second mode, the second valve may be opened first to supply a first portion of exhaust to the EGR passage to meet the desired EGR level and then the first valve supplying exhaust to the turbine is opened. The lift of the second valve is higher compared to the lift of the first valve. Due to the higher lift, a larger portion of exhaust is supplied to attain the desired EGR flow while the smaller portion of exhaust routed to the turbine is sufficient to provide the decreased boost pressure. Between time t3 and t4, due to the decrease in boost demand and EGR demand, the excess exhaust energy is used to recharge the battery of the electric motor. Therefore, the motor is operated in the generating state, supplying negative torque to the compressor, thereby converting mechanical to electrical energy to be stored in the motor battery for future applications. Compared to an engine system without the split exhaust, as shown by lines 912 and 913, in the presence of the split exhaust system, a higher amount of exhaust energy is available for recharging the electric motor, thereby increasing energy efficiency.

Due to the split exhaust system and the operation of the electric motor in the generating state, each of the desired (lower) boost pressure and the desired (lower) EGR flow is achieved within a shorter duration and exhaust energy is recovered for charging the electric motor battery. As an example, if the engine does not have a split exhaust system, as shown by dash and dot lines 906 and 910, during the transient tip-out period, there may be a delay in providing each of the desired boost pressure and the EGR flow. Similarly, if the engine does not have a split exhaust system and an assisted turbocharger, as shown by dotted lines 907 and 911, there may be delays in providing each of the desired boost pressure and the EGR flow. Between time t3 and t4, the slope of the dashed line 905 is steeper than the corresponding lines 906 and 907 and also, the slope of the dashed line 909 is steeper than the corresponding lines 910 and 911. Therefore, by using an assisted turbocharger along with the split exhaust system, desired boost pressure and EGR flow may be provided within a shorter time during transient tip-in conditions as compared to engine systems without a split exhaust and without an assisted turbocharger. Also, between time t3 and t4, as shown by dashed lines 915 and 918 respectively, the opening of the wastegate or the VGT is increased in order to bypass a larger portion of exhaust from flowing via the turbine. If the engine does not have a split exhaust system, as shown by dash and dot lines 916 and 919, during the transient tip-in, the opening of the wastegate may have to be increased and the opening of the VGT may have to be decreased to a greater degree compared to the corresponding degree of opening for an engine system with a split exhaust system and an assisted turbocharger. Similarly, if the engine does not have a split exhaust system and an assisted turbocharger, as shown by dotted lines 917 and 920, during the transient tip-in, the opening of the wastegate may have to be increased and the opening of the VGT may have to be decreased to a greater degree compared to the corresponding degree of opening for an engine system with a split exhaust system and an assisted turbocharger. Actuating (decreasing or increasing) the openings of the wastegate or the VGT to a larger extent may require a longer response time resulting in a delay in attainment of the desired boost pressure.

After time t4, in response to the transient tip-out being stabilized and the desired boost pressure and EGR flow being attained, in order to maintain the desired boost pressure and EGR flow, the controller sends a signal to the cam actuation systems to transition operation of the engine exhaust system from the second mode to the third mode. As described earlier, in the third mode, the first valve is opened first to supply a first portion of exhaust to the turbine to maintain boost pressure and then the second valve supplying exhaust to the EGR passage is opened. The lift of the second valve is higher compared to the lift of the first valve in order to supply a larger portion of exhaust as EGR. Positive torque or negative torque from the motor is not desired during this time and the electric motor is maintained in a deactivated condition. Also, the opening of the wastegate or the VGT is maintained in the current state.

In this way, by separately routing exhaust to upstream of an exhaust turbine and to upstream of an intake compressor via distinct exhaust valves, interaction between the two exhaust flows may be reduced, thereby improving boost pressure and EGR delivery during transient engine operations. By adjusting exhaust valve profiles based on each of boost error and EGR error, a target boost pressure and a target EGR flow may be maintained, thereby improving engine performance. The technical effect of coordinating an output of an electric motor with the adjustment of exhaust valve profiles is that a pressure difference may be created across the EGR valve to supply the desired EGR while reducing boost error. Overall, by providing the desired boost and EGR flow, fuel efficiency and emissions quality may be improved.

An example engine method comprises: operating an intake compressor with each of motor torque from an electric motor and mechanical torque from an exhaust turbine, flowing a first portion of exhaust from a cylinder to upstream of the compressor via a first exhaust valve while flowing a second, remaining portion of the cylinder exhaust to the turbine, and operating in a first mode with an opening and closing of the first exhaust valve advanced relative to an opening and closing of the second exhaust valve. Any of the preceding examples further comprising, additionally or optionally, operating in a second mode with the opening and closing of the second exhaust valve advanced relative to the opening and closing of the first exhaust valve. Any or all of the preceding examples, additionally or optionally, selecting between operating in the first mode and the second mode based on engine speed and load. Any or all of the preceding examples, additionally or optionally further comprising, adjusting a valve lift of the first exhaust valve relative to the second exhaust valve responsive to the selecting. In any or all of the preceding examples, additionally or optionally, wherein operating the intake compressor with motor torque includes operating with positive motor torque when actual boost pressure is below a target boost pressure and operating with negative motor torque when actual boost pressure is above the target boost pressure. In any or all of the preceding examples, additionally or optionally, wherein the valve lift is further adjusted based on the motor torque. In any or all of the preceding examples, additionally or optionally, the valve timing is further adjusted based on the motor torque. In any or all of the preceding examples, additionally or optionally, wherein operating with mechanical torque includes adjusting an opening of a waste-gate valve coupled in a bypass across the turbine based on a boost error between actual boost pressure and target boost pressure.

Another example method for a boosted engine comprises: recirculating a first portion of exhaust from a cylinder to an engine intake, upstream of an intake compressor, via an EGR passage while flowing a second, remaining portion of the exhaust from the cylinder to an exhaust turbine, via an exhaust passage, and adjusting a motor torque delivered to the compressor via an electric motor based on an error between actual EGR and target EGR. In any of the preceding examples, additionally or optionally, wherein adjusting the motor torque includes adjusting a ratio of motor torque delivered to the compressor via the electric motor relative to mechanical torque delivered to the compressor via the turbine along a shaft based on the error between actual EGR and target EGR. In any of the preceding examples, additionally or optionally, wherein adjusting the ratio includes adjusting an output of the electric motor while concurrently adjusting an opening of a waste-gate coupled across the turbine. Any or all of the preceding examples further comprising, additionally or optionally, further adjusting the opening of the waste-gate coupled across the turbine based on a boost error between actual boost pressure measured downstream of the compressor and target boost pressure, wherein each of the target boost pressure and target EGR are based on engine speed and engine load. In any or all of the preceding examples, additionally or optionally, wherein the recirculating includes adjusting each of a timing of valve opening and a valve lift of a first exhaust valve of the cylinder relative to a second exhaust valve of the cylinder to recirculate the first portion while flowing the second portion, the first exhaust valve selectively coupled to the EGR passage and not coupled to the exhaust passage, the second exhaust valve selectively coupled to the exhaust passage and not to the EGR passage.

In yet another example, an engine system comprises: an engine including a cylinder, a turbocharger including an intake compressor, an exhaust turbine, and an electric motor, wherein the intake compressor is driven via one or more of the turbine and the motor, a split exhaust system including a first exhaust passage selectively coupled to a first exhaust valve of the cylinder and a second exhaust passage selectively coupled to a second exhaust valve of the cylinder, the first exhaust passage recirculating exhaust from the cylinder to upstream of the intake compressor, the second exhaust passage flowing exhaust from the cylinder to the exhaust turbine, and a controller with computer-readable instructions for: operating the engine system in a first mode with an opening of the first exhaust valve advanced relative to the opening of the second exhaust valve and with the electric motor providing positive motor torque to the compressor, operating the engine system in a second mode with the opening of the second exhaust valve advanced relative to the opening of the first exhaust valve and with the electric motor providing positive motor torque to the compressor, operating the engine system in a third mode with the opening of the first exhaust valve advanced relative to the opening of the second exhaust valve and with the electric motor providing negative motor torque to the compressor, and operating the engine system in a fourth mode with the opening of the second exhaust valve advanced relative to the opening of the first exhaust valve and with the electric motor providing negative motor torque to the compressor. In any of the preceding examples, additionally or optionally, wherein the controller includes further instructions for: selecting between operating in the first, second, third, and fourth mode based on engine speed and load. In any or all of the preceding examples, additionally or optionally, wherein valve lift of the first exhaust valve is larger than the valve lift of the second exhaust valve in each of the first and third mode, and wherein the valve lift of the second exhaust valve is larger than the valve lift of the first exhaust valve in each of the second and fourth mode. In any or all of the preceding examples, additionally or optionally, wherein the controller includes further instructions for: transitioning between operating in the first, second, third, and fourth mode based on a boost error between actual boost pressure and target boost pressure. In any or all of the preceding examples, additionally or optionally, wherein the turbine is a variable geometry turbine, and wherein the controller includes further instructions for: adjusting a vane angle of the variable geometry turbine based on the boost error. In any or all of the preceding examples, additionally or optionally, wherein the controller includes further instructions for: transitioning between operating in the first, second, third, and fourth mode based on an EGR error between actual EGR flows via the first exhaust passage relative to target EGR flow. In any or all of the preceding examples, additionally or optionally, wherein the controller includes further instructions for: updating each of the boost error and the EGR error based on the transitioning.

In a further representation, an engine system, comprises: an engine including a cylinder, a turbocharger including an intake compressor, an exhaust turbine, and an electric motor, wherein the intake compressor is driven via one or more of the turbine and the motor, and a split exhaust system wherein a first portion of exhaust from the cylinder is recirculated to an engine intake, upstream of the intake compressor, via an EGR passage while a second, remaining portion of the exhaust from the cylinder is directed to the exhaust turbine, via an exhaust passage. Any of the preceding examples further comprising, additionally or optionally, a controller with computer readable instructions stored on non-transitory memory for: adjusting a timing of a first exhaust valve coupled to the EGR passage relative to a second exhaust valve of the cylinder coupled to the exhaust passage to vary the first portion relative to the second portion. In any or all of the preceding examples, additionally or optionally, wherein adjusting the timing includes adjusting a timing of opening the first exhaust valve relative to the second exhaust valve. In any or all of the preceding examples, additionally or optionally, wherein the controller includes further instructions for: adjusting an amount of valve lift of the first exhaust valve relative to the second exhaust valve of the cylinder to vary the first portion relative to the second portion. In any or all of the preceding examples, additionally or optionally, wherein the adjusting is based on an EGR error between actual EGR flow relative to desired EGR flow, the desired EGR flow based on operator torque demand. In any or all of the preceding examples, additionally or optionally, wherein the controller includes further instructions for: adjusting an amount of motor torque supplied from the electric motor to the intake compressor based on the EGR error. In any or all of the preceding examples, additionally or optionally, wherein the exhaust turbine is a variable geometry turbine (VGT), and wherein the controller includes further instructions for: adjusting a vane angle of the VGT based on a boost error between actual boost pressure and desired boost pressure, the desired boost pressure based on the operator torque demand. Any or all of the preceding examples further comprising, additionally or optionally, a waste-gate including a waste-gate actuator coupled across the exhaust turbine, wherein the controller includes further instructions for: adjusting an opening of the waste-gate actuator based on a boost error between actual boost pressure and desired boost pressure, the desired boost pressure based on the operator torque demand.

In a yet further representation, the vehicle is a hybrid vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   operating an intake compressor with each of motor torque from an electric motor and mechanical torque from an exhaust turbine;
   flowing a first portion of exhaust from a cylinder to upstream of the compressor via a first exhaust valve while flowing a second, remaining portion of the cylinder exhaust to the turbine; and
   operating in a first mode with an opening and closing of the first exhaust valve advanced relative to an opening and closing of the second exhaust valve.

2. The method of claim 1, further comprising:
   operating in a second mode with the opening and closing of the second exhaust valve advanced relative to the opening and closing of the first exhaust valve.

3. The method of claim 2, further comprising:
   selecting between operating in the first mode and the second mode based on engine speed and load.

4. The method of claim 3, further comprising, adjusting a valve lift of the first exhaust valve relative to the second exhaust valve responsive to the selecting.

5. The method of claim 4, wherein operating the intake compressor with motor torque includes operating with positive motor torque when actual boost pressure is below a target boost pressure and operating with negative motor torque when actual boost pressure is above the target boost pressure.

6. The method of claim 4, wherein the valve lift is further adjusted based on the motor torque.

7. The method of claim 6, wherein the valve timing is further adjusted based on the motor torque.

8. The method of claim 1, wherein operating with mechanical torque includes adjusting an opening of a waste-gate valve coupled in a bypass across the turbine based on a boost error between actual boost pressure and target boost pressure.

9. A method for a boosted engine, comprising:
recirculating a first portion of exhaust from a cylinder to an engine intake, upstream of an intake compressor, via an EGR passage while flowing a second, remaining portion of the exhaust from the cylinder to an exhaust turbine, via an exhaust passage; and
adjusting a motor torque delivered to the compressor via an electric motor based on an error between actual EGR and target EGR.

10. The method of claim 9, wherein adjusting the motor torque includes adjusting a ratio of motor torque delivered to the compressor via the electric motor relative to mechanical torque delivered to the compressor via the turbine along a shaft based on the error between actual EGR and target EGR.

11. The method of claim 10, wherein adjusting the ratio includes adjusting an output of the electric motor while concurrently adjusting an opening of a waste-gate coupled across the turbine.

12. The method of claim 11, further comprising, further adjusting the opening of the waste-gate coupled across the turbine based on a boost error between actual boost pressure measured downstream of the compressor and target boost pressure, wherein each of the target boost pressure and target EGR are based on engine speed and engine load.

13. The method of claim 9, wherein the recirculating includes adjusting each of a timing of valve opening and a valve lift of a first exhaust valve of the cylinder relative to a second exhaust valve of the cylinder to recirculate the first portion while flowing the second portion, the first exhaust valve selectively coupled to the EGR passage and not coupled to the exhaust passage, the second exhaust valve selectively coupled to the exhaust passage and not to the EGR passage.

14. An engine system, comprising:
an engine including a cylinder;
a turbocharger including an intake compressor, an exhaust turbine, and an electric motor, wherein the intake compressor is driven via one or more of the turbine and the motor;
a split exhaust system including a first exhaust passage selectively coupled to a first exhaust valve of the cylinder and a second exhaust passage selectively coupled to a second exhaust valve of the cylinder, the first exhaust passage recirculating exhaust from the cylinder to upstream of the intake compressor, the second exhaust passage flowing exhaust from the cylinder to the exhaust turbine; and
a controller with computer-readable instructions for:
operating the engine system in a first mode with an opening of the first exhaust valve advanced relative to the opening of the second exhaust valve and with the electric motor providing positive motor torque to the compressor;
operating the engine system in a second mode with the opening of the second exhaust valve advanced relative to the opening of the first exhaust valve and with the electric motor providing positive motor torque to the compressor;
operating the engine system in a third mode with the opening of the first exhaust valve advanced relative to the opening of the second exhaust valve and with the electric motor providing negative motor torque to the compressor; and
operating the engine system in a fourth mode with the opening of the second exhaust valve advanced relative to the opening of the first exhaust valve and with the electric motor providing negative motor torque to the compressor.

15. The system of claim 14, wherein the controller includes further instructions for:
selecting between operating in the first, second, third, and fourth mode based on engine speed and load.

16. The system of claim 14, wherein valve lift of the first exhaust valve is larger than the valve lift of the second exhaust valve in each of the first and third mode, and wherein the valve lift of the second exhaust valve is larger than the valve lift of the first exhaust valve in each of the second and fourth mode.

17. The system of claim 14, wherein the controller includes further instructions for:
transitioning between operating in the first, second, third, and fourth mode based on a boost error between actual boost pressure and target boost pressure.

18. The system of claim 17, wherein the turbine is a variable geometry turbine, and wherein the controller includes further instructions for:
adjusting a vane angle of the variable geometry turbine based on the boost error.

19. The system of claim 14, wherein the controller includes further instructions for:
transitioning between operating in the first, second, third, and fourth mode based on an EGR error between actual EGR flow via the first exhaust passage relative to target EGR flow.

20. The system of claim 17, wherein the controller includes further instructions for:
updating each of the boost error and the EGR error based on the transitioning.

* * * * *